US007028501B2

(12) United States Patent
Cäsar et al.

(10) Patent No.: US 7,028,501 B2
(45) Date of Patent: Apr. 18, 2006

(54) AIR-CONDITIONING SYSTEM FOR A MOTOR VEHICLE

(75) Inventors: Roland Cäsar, Stuttgart (DE); Jan Gartner, Stuttgart (DE); Steffen Geiger, Tübingen (DE); Klaus Harm, Stuttgart (DE); Jürgen Wertenbach, Fellbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/871,508

(22) Filed: Jun. 21, 2004

(65) Prior Publication Data

US 2005/0034473 A1 Feb. 17, 2005

Related U.S. Application Data

(63) Continuation-in-part of application No. PCT/EP02/13279, filed on Nov. 26, 2002.

(30) Foreign Application Priority Data

Dec. 21, 2001 (DE) .......................... 201 21 533 U

(51) Int. Cl.
*F25B 13/00* (2006.01)

(52) U.S. Cl. .................... 62/324.1; 62/324.6; 165/240

(58) Field of Classification Search ............... 62/324.1, 62/244, 324.6, 198, 199, 210, 255, 333; 165/240, 165/41, 42
See application file for complete search history.

(56) References Cited

U.S. PATENT DOCUMENTS

| | | | | |
|---|---|---|---|---|
| 4,329,206 | A * | 5/1982 | Cartland | 202/177 |
| 4,565,070 | A * | 1/1986 | Raymond | 62/81 |
| 4,769,999 | A * | 9/1988 | Fujiwara et al. | 62/114 |
| 5,048,752 | A * | 9/1991 | Hintennach et al. | 237/2 A |
| 5,099,651 | A * | 3/1992 | Fischer | 62/79 |
| 5,228,308 | A * | 7/1993 | Day et al. | 62/198 |
| 5,243,825 | A * | 9/1993 | Lin | 62/238.7 |
| 5,245,836 | A * | 9/1993 | Lorentzen et al. | 62/174 |
| 5,301,515 | A * | 4/1994 | Iritani et al. | 62/126 |
| 5,477,915 | A * | 12/1995 | Park | 165/206 |
| 5,558,273 | A * | 9/1996 | Swenson et al. | 237/2 B |
| 5,560,217 | A * | 10/1996 | Takahashi et al. | 62/200 |
| 5,609,036 | A | 3/1997 | Nagasawa et al. | |
| 5,819,551 | A * | 10/1998 | Fukumoto et al. | 62/324.1 |
| 6,351,959 | B1 * | 3/2002 | Hirota | 62/198 |
| 6,422,308 | B1 * | 7/2002 | Okawara et al. | 165/202 |
| 6,705,101 | B1 * | 3/2004 | Brotz et al. | 62/198 |
| 6,775,998 | B1 * | 8/2004 | Yuasa et al. | 62/197 |
| 6,810,952 | B1 * | 11/2004 | Ben Fredj et al. | 165/202 |

FOREIGN PATENT DOCUMENTS

| | | | |
|---|---|---|---|
| DE | 39 07 201 | | 9/1990 |
| DE | 43 18 255 | | 12/1993 |
| DE | 44 32 272 | | 3/1996 |
| DE | 198 13 674 | | 4/1999 |
| EP | 0 989 003 | | 3/2000 |
| JP | 06-183247 | A * | 7/1994 |
| JP | 06-347111 | A * | 12/1994 |

* cited by examiner

*Primary Examiner*—Mohammad M. Ali
(74) *Attorney, Agent, or Firm*—Klaus J. Bach

(57) ABSTRACT

In an air-conditioning system for a motor vehicle having an integrated heat pump for cooling and heating, in which refrigerant is circulated and which allows heat exchange with the incoming air for the interior compartment of the motor vehicle, the heat transfer is effected either directly, by means of a refrigerant/air heat exchanger through which the air for the interior compartment is conducted, or by means of a secondary refrigerant circuit, which includes two expansion devices and three heat exchangers provided in the refrigerant circuit of the system.

10 Claims, 22 Drawing Sheets

AIR-CONDITIONING SYSTEM FOR A MOTOR VEHICLE

This is a Continuation-In-Part Application of International Application PCT/EP02/13279 filed Nov. 26, 2002 and claiming the priority of German Application 201 21 533.0 filed Dec. 21, 2001.

BACKGROUND OF THE INVENTION

Air-conditioning equipment in vehicles form part of the prior art for the cooling, drying, heating and ventilation of vehicle interior compartments. The air is cooled and dried by means of refrigeration installations, while for heating purposes the cabin air is normally heated in heating heat exchangers which make the waste heat from the engine available. The cabin is ventilated by means of outside air or re-circulated air from the cabin via air blowers. Furthermore, the air-conditioning equipment is used to control the distribution of air in the cabin.

Refrigeration installations for the air-conditioning of a cabin in vehicles are known for cooling/drying and heating purposes. In these installations, a pressure which is supercritical with respect to the critical pressure in the circuit is generated on the high-pressure side of a vapor compression circuit, which includes a compressor, a gas cooler/condenser, an internal heat exchanger and a throttling device with at least one evaporator, which are connected in series, and form an integral, closed circuit for providing refrigeration or heating. In these installation, also a sub-critical pressure is reached on the low-pressure side of the circuit, while thermal energy is supplied to, or refrigeration energy is discharged from the refrigerant, which has been cooled on the low-pressure side, via the evaporator, and the refrigerant mass flow in the circuit is controlled by regulating it in the compressor (DE 44 322 72 C2). There is no configuration which relates to an incorporation of the installation in the air-conditioning unit of a vehicle with regard to the various operating modes of heating, cooling and drying.

DE 198 13 674 C1 describes a refrigeration installation with heat pump function which uses the refrigeration circuit to transfer heating capacity to the cabin air of vehicles. The objective in this case is to increase the efficiency of the heating immediately after the vehicle has been started up and to shorten its response time. This is achieved by using the refrigeration installation as a heat pump, with the heat being introduced into the refrigerant in the ambient heat exchanger using outside air and further heating being carried out in an exhaust-gas heat exchanger with the exhaust gases of an internal combustion engine. The refrigerant is subsequently compressed in the refrigerant compressor and cold vehicle interior compartment air which has been sucked in is conducted through the interior compartment heat exchanger. In this way, the vehicle interior compartment air is heated in the interior compartment heat exchanger, and, as a result, the vehicle cabin is heated. If the installation is used to cool and dry the vehicle interior compartment air, the interior compartment heat exchanger cools and dries the humid vehicle interior compartment air which has been sucked in. As a result, the vehicle interior compartment air is cooled, the water vapor contained in the air which has been sucked in is condensed and the vehicle cabin is air-conditioned.

This document does not solve the problem of the windows in the vehicle cabin fogging up when the refrigeration installation is switched from cooling and drying to heating.

DE 4318255 A1 describes a device for air-conditioning the interior compartment of a vehicle equipped with a drive which generates waste heat. This includes a refrigerant circuit and a heating-agent circuit, which can only be coupled in a heat-exchanging manner via at least one first heat exchanger. Whereas the heating-agent circuit includes a heat exchanger for capturing the waste heat from the drive unit and a heating heat exchanger arranged in the path of the air which is to be transported to the vehicle interior, the refrigerant circuit comprises, in the path of the air, an evaporator, a bypass passage and a waste-air passage leading to the latter and a waste-air port and also a refrigerant compressor. For cooling operation, a condenser and cooler can be integrated into the two circuits by means of switchover valves; the heating heat exchanger can also be disconnected by means of a valve-fitted bypass. The intention is to achieve various energy-saving air-conditioning objectives in the vehicle.

One drawback of these solutions is that the cabin air is not heated directly, but rather by means of a heating heat exchanger in the heat-transfer medium circuit as part of the engine cooling system. On account of the thermal masses involved, the inertia of the system is high, which has an adverse effect on the heating dynamics and is not compatible with traffic safety objectives.

DE 3907201 C2 discloses a motor vehicle equipped with an air-conditioning system which has a heating mode, i.e. it also acts as a heat pump. In order, in the heating mode, to prevent the uptake of moisture which may have precipitated in the evaporator in the preceding cooling mode by the air which is to be conditioned, various measures are proposed. For example, for the heating mode a separate heat exchanger is provided, and furthermore a moisture sensor may be arranged at the interior compartment heat exchanger, which, depending on the moisture level determined, either suppresses the heating mode or activates a dehumidification device provided downstream of the cooling evaporator for conditioning the air.

A drawback of one solution is that, under certain frequent vehicle operating conditions such as previous drying of the air for the vehicle cabin at outside temperatures of, for example, 0° C. to 10° C., heating operation is not possible or only a very limited capacity can be obtained from the installation. The other solution avoids the desirable continuous drying of air when utilizing the refrigeration installation in a heat pump mode and therefore does not comply with the requirements of keeping the windows in the vehicle cabin free of fogging, in particular in an air recirculation mode. Dehumidification devices based for example on adsorptive materials cause a pressure drop in the air mass flow for the ventilation of the vehicle cabin and have to be desorbed periodically. To achieve continuity in this case, it is necessary to provide at least two dehumidification devices between which it is possible to switch, which, in combination with electric heating and air delivery means as well as an outgoing flow for desorption, involves a considerable technical outlay.

EP 09 898 003 A2 describes a refrigeration circuit with a heat pump for use particularly in a vehicle which is not operated using an internal combustion engine. The system includes an air-conditioning device with two heat exchangers, through which refrigerant flows, a first condenser and an evaporator. In the air-conditioning unit, the heat exchanger arranged down-stream with respect to the incoming cabin air is directly fluid-connected to the high-pressure side of the compressor, and, depending on the operating situation, hot refrigerant under a high pressure flows through it. For the required heating of the cabin, the interior compartment air flow is conducted through this component only when required. In the cooling and drying mode, the refrigerant flows from the compressor through the first condenser in the air-conditioning unit, is then cooled in the second condenser, expanded and liquefied in a throttling device and then, in order to take up heat for cooling the cabin air, passes into the evaporator. Accordingly, in a pure cooling mode, no air flows across the first condenser. In the cooling mode with reheating, as required for dehumidification, only a partial flow passes via this component. For dehumidification purposes, the refrigerant successively flows through the first condenser, through the second condenser, then, in liquefied form, through the throttling location into the evaporator, to the accumulator and back to the compressor. In all three operating modes (cooling, cooling and reheating and heating), all of the refrigerant is always passed first through the first condenser, then through the second condenser, the evaporator and via the accumulator, wherein different pressures and temperatures at different throttling locations can be set, to various bypass locations to configure the circuit in different ways.

Drawbacks are that a high thermal load is constantly introduced into the air-conditioning unit, the heating heat exchanger has to withstand high temperature and pressure loading, the piping of the installation in the vehicle is complex and takes up a considerable amount of space, there are avoidable pressure drops with a reduction in efficiency and a substantial amount of refrigerant is required. Therefore, the installation does not satisfy the general demands with regard to complexity, costs, efficiency, performance and ecological requirements.

The prior art therefore describes systems in which the refrigeration installation evaporator, i.e. the heat exchanger through which refrigerant flows, when the refrigeration installation is operating in the cooling mode, cools and dries the air entering the vehicle interior compartment, or, when the refrigeration installation is operating in the heating mode, heats the air which enters the vehicle interior. In the cooling mode, the water vapor in the air condenses at the cold surfaces of the heat exchanger. Therefore, in the heating mode, the water adhering to the surface of the heat exchanger through which the refrigerant flows may evaporate and humidify the air entering the vehicle interior. This can lead to increased fogging of the windows. To keep the windows free of such fogging, according to the prior art the incoming air mass flow is cooled at temperatures of approx. −4° C. and 10° C. by the refrigeration installation in the cooling mode, and is thereby dried, and is then heated in the heating heat exchanger to the required air temperature in what is known as the "reheat mode". When the heat exchanger through which refrigerant flows is being used for heating purposes, the function of cooling and therefore drying cannot be performed simultaneously.

It is therefore an object of the present invention to reconfigure and extend an arrangement of components of a refrigeration installation in vehicles so as to improve the heating capacity in vehicles in all operating states, and allowing the refrigeration installation to be switched in any desired way between heating and cooling operation without the windows fogging up.

A second object of the present invention is to dry the air entering the vehicle interior even when the heat pump is operating and at outside temperatures which are well below those which are currently possible.

A third object of the invention is to maintain passenger comfort by storing heat (e.g. for heating and cooling purposes) in the event the engine is switched off for a brief period of time.

SUMMARY OF THE INVENTION

In an air-conditioning system for a motor vehicle having an integrated heat pump for cooling and heating, in which refrigerant is circulated and which allows heat exchange with the incoming air for the interior compartment of the motor vehicle. The heat transfer is effected either directly, by means of a refrigerant/air heat exchanger through which the air for the interior compartment is conducted, or by means of a secondary refrigerant circuit, and which includes two expansion devices and three heat exchangers in the refrigerant circuit of the system.

The object is achieved, with regard to the interior compartment, by two basic arrangements:

A: An integrated heat pump installation for cooling and heating, which introduces the energy directly into the air stream for the vehicle cabin. This is achieved by means of heat exchangers through which refrigerant flows in the air-conditioning unit of the vehicle, wherein for heating purposes the refrigerant is cooled and if appropriate condensed and in which for cooling purposes the refrigerant is evaporated.

B: An integrated heat pump installation for cooling and heating, which introduces the energy indirectly, via heat-transfer liquids, into the air flow for the vehicle cabin. This is achieved by means of liquid/air heat exchangers in the air-conditioning unit of the vehicle, in which to heat the air flow the secondary refrigerant is cooled and in which to cool the air flow, the secondary refrigerant is heated.

The arrangements may be configured both in the form described and in combination with one another.

For both arrangements, for the heat pump mode, there is in each case the option to use the coolant of the vehicle drive unit (FIG. 5, 7, 11, 12, 14, 16) or the outside air (FIG. 6, 8, 13, 15, 17, 18, 20, 21, 22) as the main heat source. The sensible and latent heat may contribute to the heat pump function as an auxiliary heat source (FIG. 9, 10, 19).

With regard to the present invention in a refrigeration circuit, in cooling mode the refrigerant flows from the compressor, via a switching valve and via the condenser/gas cooler and if appropriate the high-pressure side of the interior heat exchanger, where the refrigerant is liquefied, to a first expansion valve, and via the evaporator, the collector and if appropriate the low-pressure side of the interior heat exchanger and via a further switching valve, back into the refrigerant compressor. The gas cooler dissipates heat to the environment. The evaporator is located in the air-conditioning unit. It cools and dries the interior compartment air for the vehicle cabin. The mass flow of refrigerant circulating in the circuit can be set by means of the compressor, the delivery volume of which is controllable. This allows the desired evaporator temperature to be set. When the refrigeration installation is operating for cooling purposes, two operating situations may occur, namely cooling and drying or cooling/drying and reheating. In the latter operating mode, the air is heated by means of the heating heat exchanger downstream of the evaporator.

In the heating mode, the refrigerant flows from the compressor, diverted by the switching valve, through a gas cooler/condenser in the air-conditioning unit, a first expansion valve, the evaporator, a second expansion valve in order to take up heat, into a heat exchanger and, via a second switching valve, back to the compressor. The circuit is therefore closed.

Useful heat is released in the heating mode in the gas cooler/condenser. The latter can pass on the heat in various ways. It may be arranged directly in the air-conditioning unit, downstream of evaporator and heating heat exchanger, or may be introduced into the heating-agent stream and used by the heating heat exchanger to heat the interior compartment air for the cabin. The pressure and therefore the temperature in the refrigerant evaporator can be varied by means of the first expansion valve and the second expansion valve. This is on the one hand essential in order to provide for drying, and on the other hand, if the heat exchanger surface is dry, the evaporator can be used to increase the heating capacity of the installation. Heat is taken up into the refrigeration circuit via the ambient heat exchanger at an evaporator temperature below the outside temperature. As an alternative to the ambient heat source, it is also possible to make use of the engine heat using an engine coolant/refrigerant heat exchanger. In this case, the refrigerant flows from the compressor, diverted by the switching valve, through the heat pump condenser, a first expansion valve, through the evaporator, via a second expansion valve, in order to take up heat, into the engine coolant/refrigerant heat exchanger and then if appropriate via a second switching valve back to the compressor. The circuit is therefore likewise closed.

When the heat pump is operating for heating purposes, two operating situations may arise: heating and drying or heating. In the first case, the compressed refrigerant is condensed/cooled in the heat pump condenser. In the process, it releases its heat directly to the cabin air or introduces it indirectly into the heating-agent stream upstream of the heating heat exchanger. The refrigerant then reaches a controllable expansion valve, in which it is controlled to a temperature which is sufficient for drying of the air and is as far as possible comfortable. Then, the refrigerant is expanded to a temperature below that of the heat source. Here, the refrigeration circuit takes up heat. In the heating operating mode, the compressed refrigerant is condensed/cooled in the heat pump condenser. In the process, it releases its heat directly to the cabin air or introduces it indirectly into the heating-agent stream upstream of the heating heat exchanger. The refrigerant then reaches the fully open first expansion valve, in which the refrigerant is only slightly throttled, and the refrigerant can be further cooled. The incoming cabin air is preheated. This makes it possible to further increase the heating capacity of the installation. Then, the refrigerant is expanded to a temperature below that of the heat source. In the process, the refrigeration circuit takes up heat and the refrigerant is returned to the refrigerant compressor.

At the start of driving, the integrated heat pump installation, in the heating mode, is sufficient to heat the vehicle, without the need for waiting until the engine coolant is warm enough.

If the dissipation of heat in an integrated heat pump installation, in heating mode, is effected indirectly via a heat-transfer medium circuit, it is possible for further heat exchangers which exchange heat with other operating liquids and components to be provided in this circuit. The connection of the circuit is dependent on the heating priority of the components or systems. They are therefore located upstream or down-stream of the heating heat exchanger.

Accordingly, when driving commences, with the integrated heat pump installation operating in cooling mode, for heating purposes heat can be introduced indirectly into the circuit via the heat-transfer medium circuit, and this heat can be used to heat other operating liquids and components. In this case, the dissipation of heat from the refrigerant circuit is very high.

Furthermore, the invention includes, instead of the evaporator acted on directly by air and refrigerant in the air-conditioning unit, a heat-transfer liquid/air heat exchanger. Therefore, the transfer of heat to the interior compartment air takes place indirectly via a small active circuit of heat-transfer liquid. The heat-transfer liquid circuit comprises a liquid pump and a liquid/air heat exchanger. In addition, the heat-transfer liquid circuit may include a liquid storage vessel, which can increase the volume of liquid which is in circulation. Only a small volume of liquid circulates within this liquid circuit until the criteria for charging the storage vessel are satisfied. Then, a partial volume of the circulating liquid flows into the storage vessel until the storage vessel has adopted a desired or achievable temperature. This can be maintained during standard vehicle operation. If the capacity of the refrigeration installation then drops or if the refrigeration installation is switched off, it is possible for the temperature of the circulating heat-transfer liquid to be kept at a usable temperature level for a certain period of time by removing the heat-transfer liquid contained in the storage vessel.

The invention also describes a refrigeration circuit in which the heat transfer takes place indirectly during the cooling and heating of the air stream and in which the direction of flow of the refrigerant in the refrigeration circuit is reversible. During cooling operation, the refrigerant flows from the compressor via a switching valve and via the condenser/gas cooler and the high-pressure side of the interior heat exchanger to a first expansion valve, in which the refrigerant is liquefied, and via the evaporator, the collector and the low-pressure side of the interior heat exchanger and via a further switching valve back to the refrigerant compressor. The condenser/gas cooler dissipates heat to the environment. The evaporator is designed as a refrigerant/heat-transfer liquid heat exchanger and is located outside the air-conditioning unit. It exchanges its heat with a heat-transfer liquid, which then, in a liquid/air heat exchanger, cools and dries the interior compartment air flow for the vehicle cabin. The mass flow of refrigerant circulating in the circuit can be controlled by means of the compressor, the delivery volume of which is controllable. A desired evaporator temperature can be set by the optionally controllable pump for circulating the heat-transfer liquid. When the refrigeration installation is operating for cooling purposes, two operating situations may occur, namely cooling and drying or cooling/drying and reheating. In the latter operating mode, the air stream for the interior compartment is heated in the air-conditioning unit via the heating heat exchanger downstream of the evaporator liquid/air heat exchanger.

In the heating mode, the refrigerant flows from the compressor, via a switching valve and via the refrigerant/heat-transfer liquid heat exchanger, in the bypass, through the first expansion valve and the interior heat exchanger to a further expansion device, in which the refrigerant is liquefied, and via the gas cooler/condenser and via a further switching valve, back to the refrigerant compressor. In this case, medium may flow through the collector and the interior heat exchanger. The gas cooler supplies heat from the environment. The hot heat-transfer liquid flows through the liquid/air heat exchanger air-conditioning unit when the heat exchanger air side is dry and heats the interior compartment air flow for the vehicle cabin. When the heat exchanger air side is wet, the warm heat-transfer liquid is passed into the coolant circuit of the vehicle drive unit and is fed to the interior compartment via the heating heat exchanger in the air-conditioning unit.

By virtue of the invention, it is possible to use a heat pump installation for the cooling and drying and heating of the interior-compartment air for the vehicle cabin. It is possible to switch between the heating and cooling operating modes as desired without any adverse effect from window misting, in particular in winter. Furthermore, if necessary continuous drying of the interior compartment air is possible even when the heat pump is operating. The spontaneous response of the heat pump as heater means that the engine coolant is not required for heating purposes. Consequently, the engine reaches its operating temperature quickly. It is possible to reduce fuel consumption and pollutant emissions. If heat-transfer liquids are used to transport energy in order to cool and heat the interior compartment air, there are no components which carry refrigerant in the interior compartment or in the air stream to the vehicle cabin. This means that it is also possible to use, in vehicles, refrigerants which are advantageous for the particular application but are ruled out on account of combustibility or for toxicological reasons. If heat-transfer liquids are used, the active liquid volumes are small. After the vehicle has been started up, rapid heating or cooling of the interior compartment is possible. The circuit can be expanded by an additional storage volume. This maintains a high degree of thermal comfort even in the event of brief stops. After driving has been interrupted briefly, when the vehicle is started up a pre-conditioned storage volume with a corresponding heat capacity is available in order to rapidly implement conditioning of the interior compartment.

When the heat pump installation is used for cooling and heating, it is possible to employ either the heat, which is to be dissipated or the useful heat which has been made available, to heat various vehicle systems, such as the engine, transmission, differential transmission, etc. As a result, the fuel consumption drops considerably after a cold start, and component wear is considerably reduced. Furthermore, in the cooling mode, initially very large amounts of heat are withdrawn from the circuit, which in turn results in a high initial performance of the refrigeration installation, making it possible to achieve comfortable conditions in the interior compartment more quickly.

Further features and embodiments of the invention will become more readily apparent from the following description on the basis of the accompanying drawings. The features and combinations of features cited above and listed below can be used not only in the combination indicated in each instance, but also in other combinations or on their own without departing from the scope of the invention.

DESCRIPTION OF PREFERRED EMBODIMENTS

Figure 1:
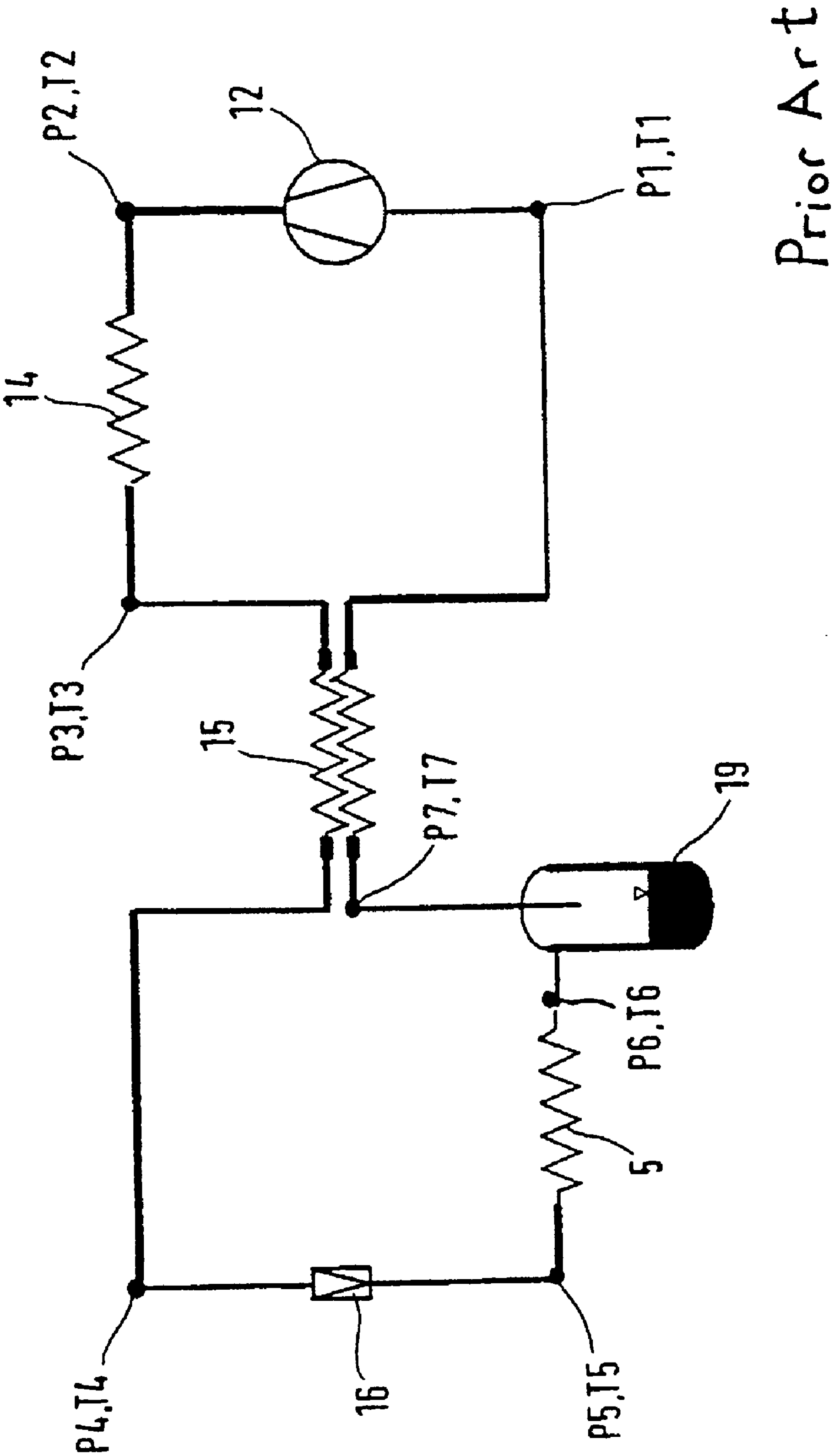
FIG. 1 diagrammatically shows a vapor compression circuit with a controllable compressor and a throttling means.

FIG. 1 shows a circuit which includes, connected in series one after the other, a compressor 12, a gas cooler/condenser 14, an internal heat exchanger 15, a throttling means 16, an evaporator 5 and a collector 19. The mass flow of refrigerant in the compressor is controllable. The throttling means 16, which may be an expansion valve, is likewise controllable.

Figure 2:
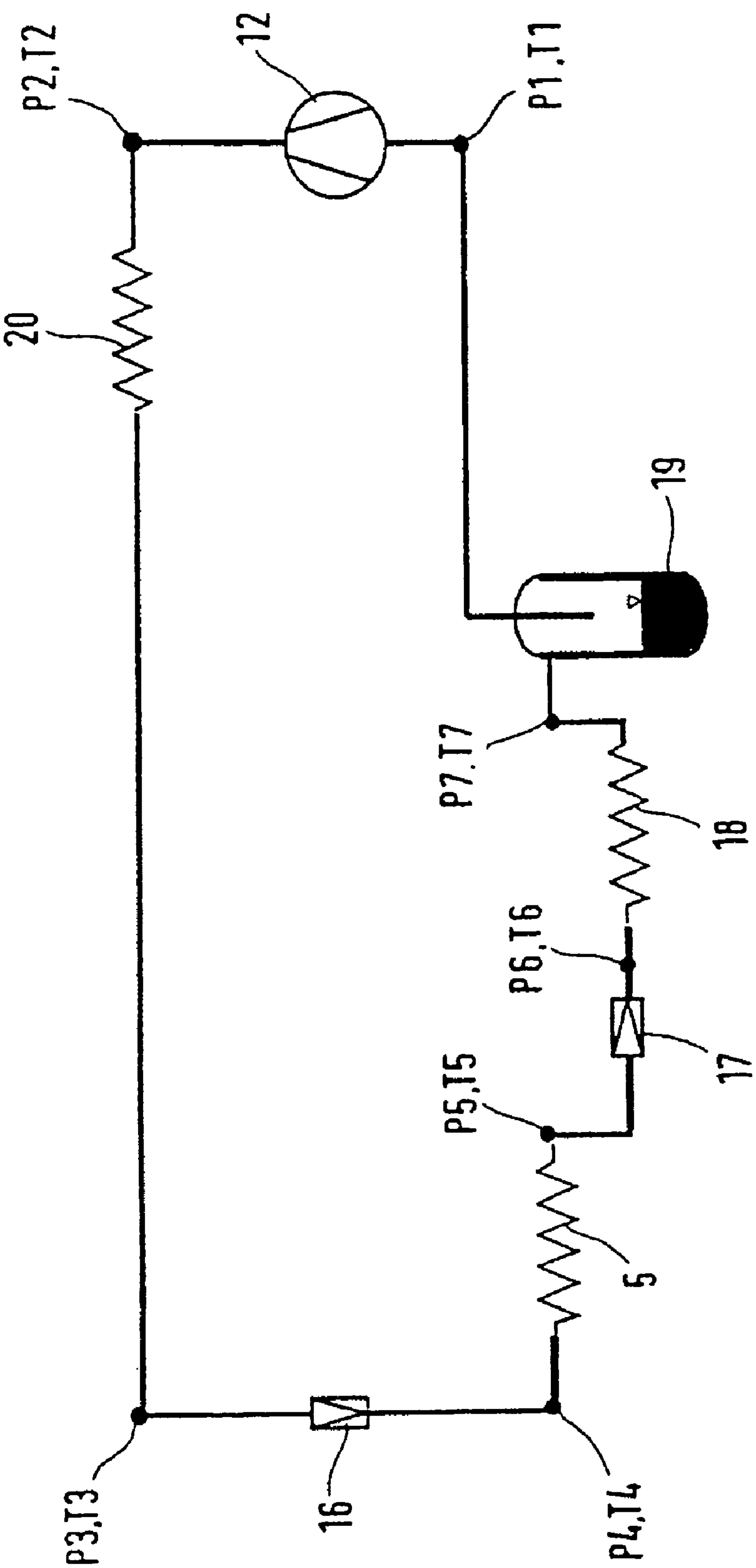
FIG. 2 diagrammatically shows a vapor compression circuit with a compressor, a second heat exchanger and a second throttling means.

FIG. 2 shows a refrigeration circuit which is designed as a heat pump and includes, connected in series one after the other, a compressor 12, a gas cooler/condenser 20, a first throttling means 16, a first evaporator 5, a second throttling means 17, a second evaporator 18 and a collector 19. The mass flow of refrigerant in the compressor is controllable. The first throttling means 16 is also controllable, and the second throttling means 17 may be designed such that it can be shut off in a controllable and sealed manner. The second throttling means 17 may also be designed as a constant throttling element with an additional shut-off means. Evaporator 5 is operated as an evaporator when the heat pump installation is in cooling mode. In heating mode, it can perform two functions, as an evaporator or as a gas cooler. If, in the heating mode, prior to the actual heating of the cabin air, this air is dried, or if the air-side surface of the evaporator is still wet with condensate, the evaporator operates as an evaporator. This operating situation often occurs at outside temperatures of approximately 10 K above freezing point and approximately 10 K below freezing point. If the air-side surface is dry and the air is not being dried, such as at air inlet temperatures below freezing point, the evaporator 5 is operated as a gas cooler/condenser.

Figure 3:
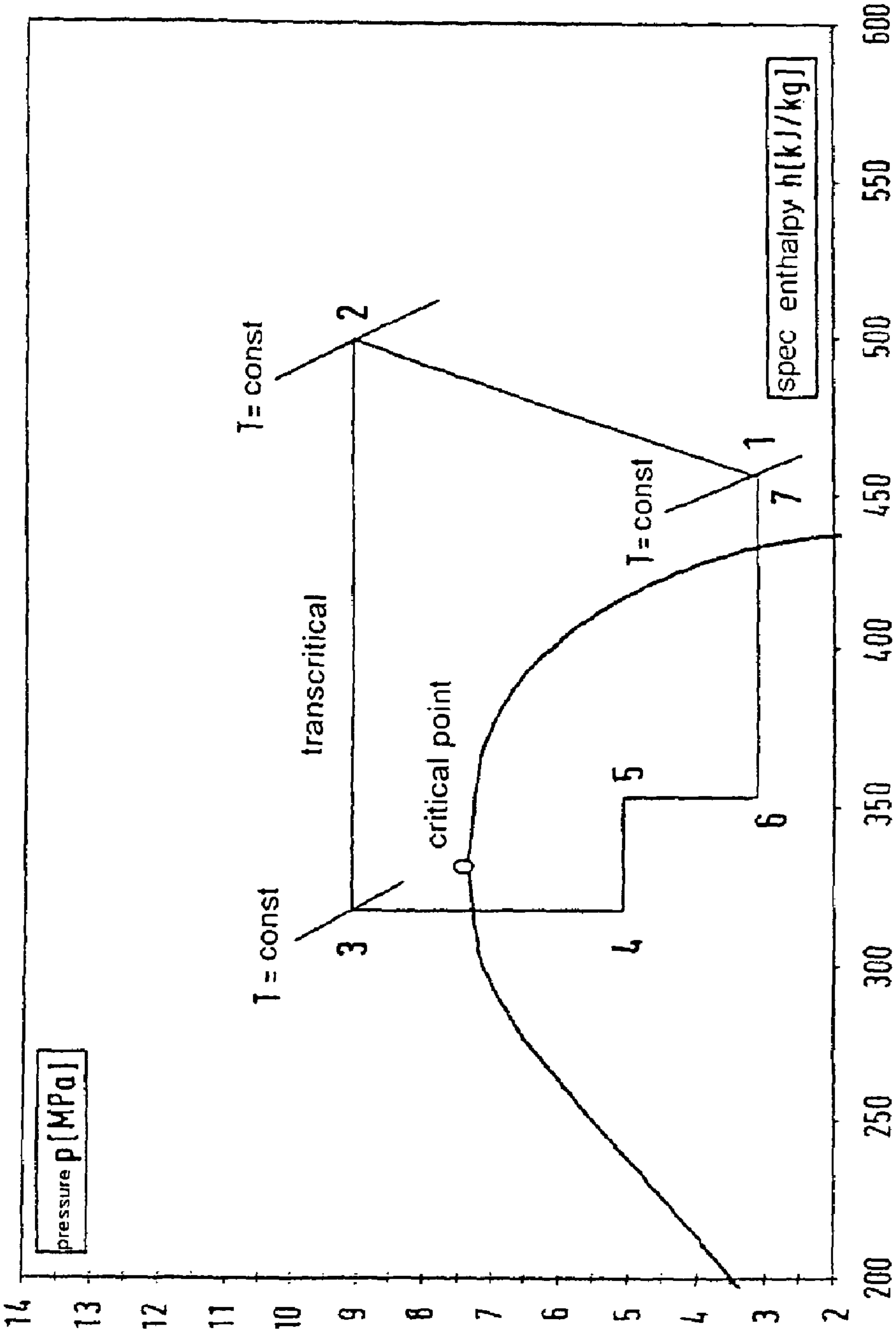
FIG. 3 depicts a p-h diagram of a refrigerant circuit with a compressor, heat exchangers and throttling means.

If the compressor 12 operates under a high load—i.e. in a heat pump installation which is in heating mode, for example in a transcritical refrigeration process, it compresses, as shown in FIG. 3, a mass flow of refrigerant from a starting pressure P1 to a higher pressure P2 which is above the critical pressure, with the refrigeration process temperature rising from T1 to T2. The compressed, gaseous refrigerant is isobarically cooled to a temperature T3 in the gas cooler/condenser 20 by means of a coolant flowing through the cooler/condenser 20, such as the air mass flow for the vehicle cabin or a heat-transfer liquid.

As it flows through the expansion valve 16, the refrigerant is expanded isenthalpically to an intermediate pressure P4, which is between the starting pressure P1 and the compression pressure P2, with the refrigerant being cooled further to a temperature T4 which may already be in the liquefaction range of the refrigerant. If the two-phase gas/liquid mixture of the refrigerant which may be formed in this way reaches the evaporator 5, a liquid fraction of the two-phase mixture evaporates as a result of the uptake of heat. As it flows through the expansion valve 17, the refrigerant is isenthalpically further expanded to the starting pressure P1, with the temperature of the refrigerant dropping to T6. The introduction of heat from the outside air or the engine coolant causes the refrigerant to be heated to temperature T7. If not all of the liquid fraction of the refrigerant is evaporated, the liquid refrigerant then collects in the buffer vessel 19, from where the gaseous refrigerant passes to the compressor 12.

Figure 4:
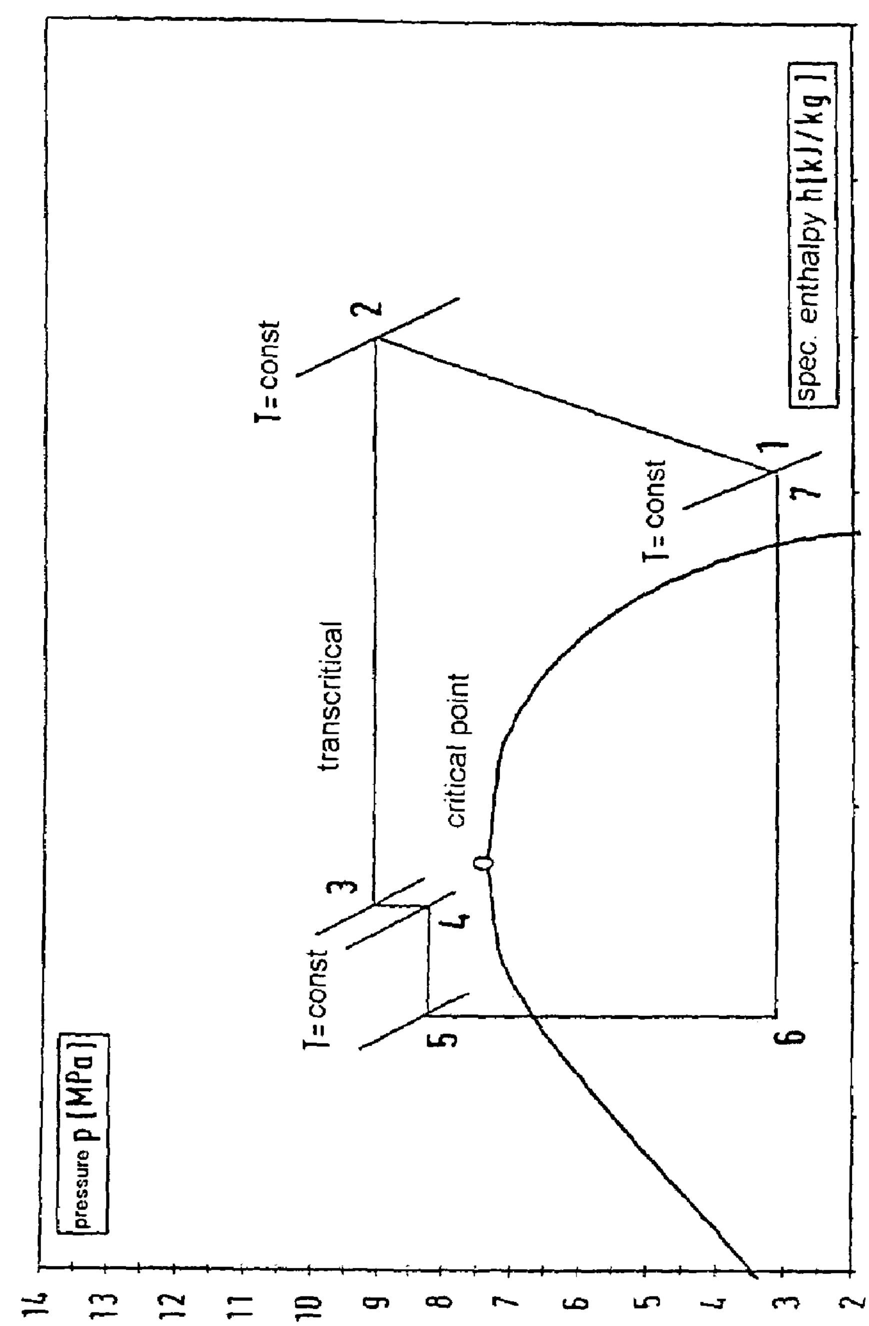
FIG. 4 depicts another p-h diagram of a refrigerant circuit with a compressor, heat exchangers and throttling means.

In the diagram of FIG. 4, by contrast, the expansion valve 16 is in its fully open position. Consequently, the refrigerant is only subject to slight expansion. The intermediate pressure P4 virtually corresponds to the compression pressure P2. The refrigerant is cooled further, to temperature T5. The evaporator 5 is now operating as a gas cooler/condenser. As it flows through the expansion valve 17, the refrigerant is isenthalpically expanded to the starting pressure P1, with the temperature of the refrigerant dropping to T6. The introduction of heat from the outside air or the engine coolant causes the refrigerant to be heated to temperature T7. If not all of the liquid fraction of the refrigerant is evaporated, the refrigerant then collects in the buffer vessel 19, from where it passes into the compressor 12.

Figure 5:
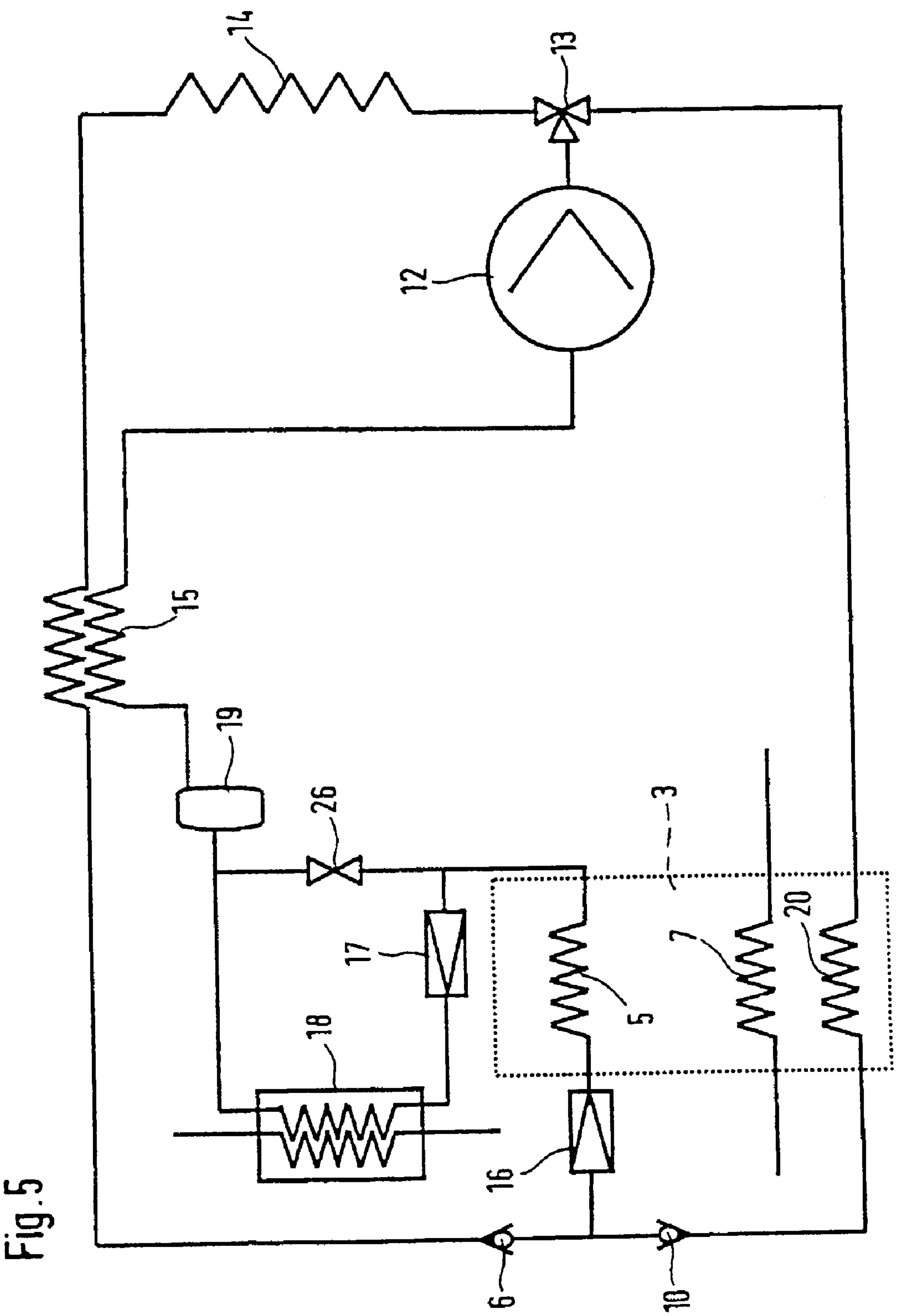
FIG. 5 diagrammatically shows an integrated heat pump installation which, in heating mode, allows two-stage expansion and operates with heat being taken up on the water side.

FIG. 5 diagrammatically shows an integrated heat pump installation.

After compression, the refrigerant passes at a high pressure and temperature into the switching valve 13, which switches to the cooling or heating operating mode. If the valve 13 has been switched to the cooling operating mode, the refrigerant dissipates heat to the environment via the gas cooler (14) and is cooled further in the high-pressure part of the interior heat exchanger (15). After it has passed through the nonreturn valve (6), the refrigerant is expanded to evaporation pressure in the first expansion valve (16). The operating point is in the two-phase region. In the evaporator 5, it takes up heat from the air stream for the vehicle cabin, which is cooled as a result. The second expansion valve (17) is not actuated and is therefore closed. The refrigerant flows through the open valve (26) into the collector (19). On the low-pressure side of the internal heat exchanger (15), the refrigerant is superheated and is then sucked in by the compressor (12). In the air-conditioning unit, the air stream for the cabin is cooled; the atmospheric humidity which it contains is condensed at the cold surfaces of the heat exchanger. If necessary, the air is heated accordingly by means of the heating heat exchanger 7.

If the valve 13 has been switched to the heating operating mode, the refrigerant dissipates the heat to the air stream for the vehicle cabin via gas cooler/condenser (20). After it has passed through the non-return valve (10), the refrigerant enters the first expansion valve (16). After corresponding throttling and uptake of heat or dissipation of heat in the evaporator 5, the refrigerant flows through the second expansion valve 17, in which it is isenthalpically expanded to the evaporator pressure level of the heat uptake. The valve 26 is closed. In the refrigerant/heat-transfer fluid heat exchanger 18, heat is fed to the refrigerant from the engine coolant, with superheating of the refrigerant if appropriate. The refrigerant flows through the collector 19 and leaves the collector 19 with a defined refrigerant quality, i.e. ratio of gaseous mass flow to the overall mass flow of the refrigerant. The refrigerant then flows through the low-pressure side of the interior heat exchanger and reaches the compressor. Non-return valve (6) and (10) are not necessarily required for the heat pump installation to function. In both operating situations, they prevent the part of the circuit which is not required in each instance from filling up with refrigerant. To compensate for this happening, with regard to performance and efficiency, it would be necessary to use more refrigerant in the installation, which is not desirable for reasons of environmental protection.

Two operating strategies are possible for the control of the opening of the expansion valves 16 and 17 and therefore the setting of the intermediate pressure level:

In the first case, the air which is passed into the vehicle cabin should be dried before being heated, or the air-side surface of the heat exchanger is wetted with condensate. Drying of the air will be necessary whenever the air flowing in has a dew point which is above freezing point. It is particularly expedient for the evaporation temperature of the refrigerant in this component to be matched to the outside temperature, in order to ensure the required drying here so as to reliably prevent the windows from fogging up without, however, excessively dehumidifying the air, for hygiene reasons. Therefore, it is no longer a problem to operate the air-conditioning unit in re-circulated air mode even in winter, for example to increase comfort when heating the cabin or to reduce the levels of pollutants introduced into the cabin. The moisture content of the air flowing into the evaporator can be determined by means of a moisture sensor, dew point sensor, fogging sensor on the windshield, etc. Therefore, it is possible, given knowledge of the outside temperature, to determine the need for drying. A wetness sensor at a characteristic position on the surface of the evaporator makes it possible to determine whether the evaporator is wet. In this case, the evaporator can then continue to be operated as an evaporator. The evaporation temperature is either controlled in the same way as during drying or is kept in the vicinity of freezing point.

During control of the expansion valves, if the actual temperature is too low, the first expansion valve 16 is opened slightly more and the expansion valve 17 is closed slightly more, until the evaporation temperature in the evaporator has reached the desired set temperature. Conversely, if the actual evaporator temperature is above the set temperature, the expansion valve 16 is opened slightly less and expansion valve 17 is opened slightly more. The desired compression pressure remains unaffected by this measure, since the overall pressure loss through the first expansion valve 16, the evaporator 5 and the second expansion valve 17 remains constant.

In the second case, the evaporator is to be used to preheat the air flowing into the cabin. This is only appropriate if the air-side surface of the evaporator is dry. If introduction of moisture into the interior compartment resulting from evaporating water can be reliably avoided by suitable measures, the expansion valve 16 is fully open. As a result, two heat exchangers in countercurrent with the cabin air in the air-conditioning unit are heated. A very high heat transfer capacity can be established. The temperature at which the refrigerant enters the evaporator 5 is virtually equal to the refrigerant exit temperature at the gas cooler/condenser 20 in the air-conditioning unit 3.

Figure 6:
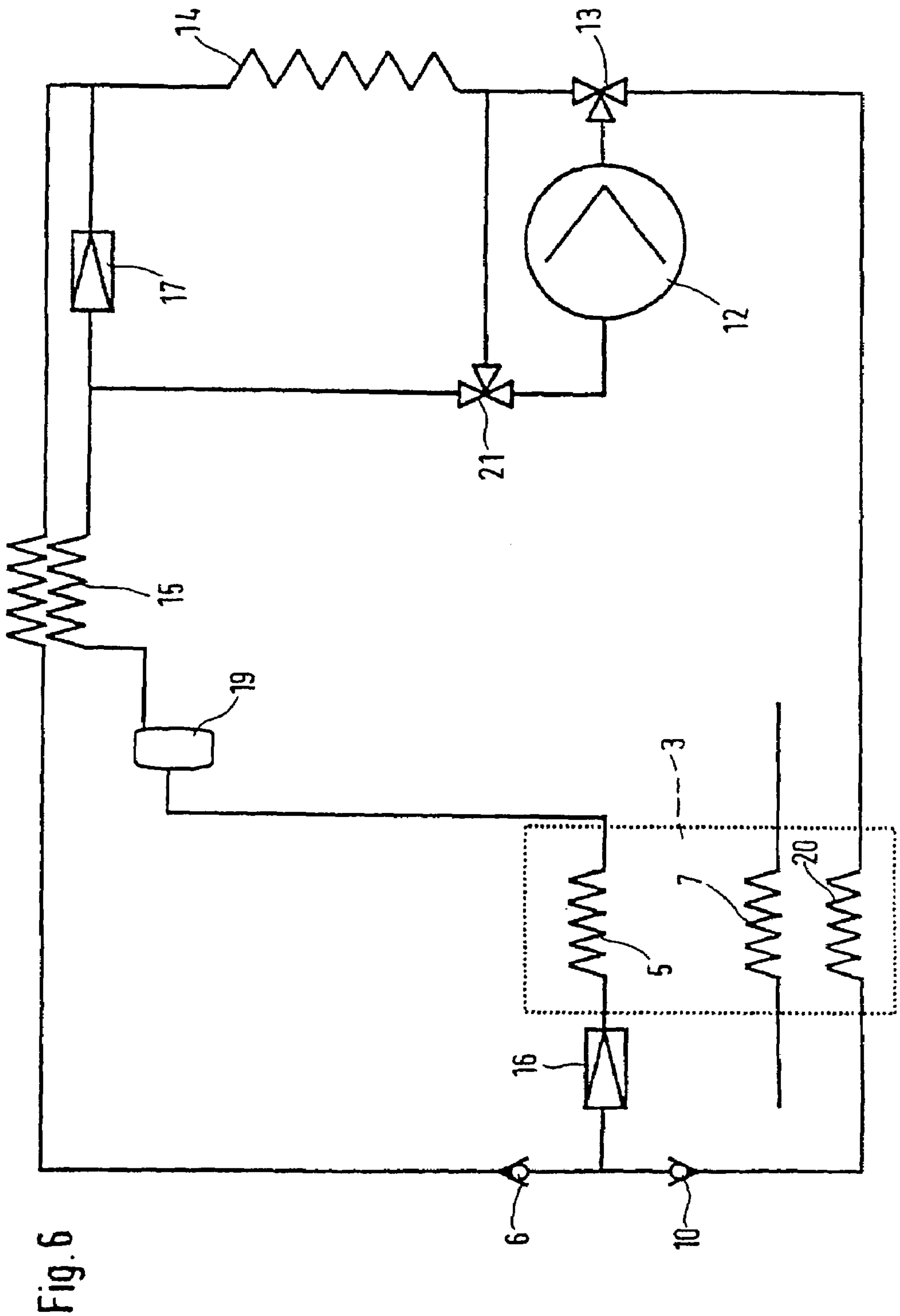
FIG. 6 diagrammatically shows an integrated heat pump installation which, in heating mode, allows two-stage expansion and operates with heat being taken up on the air side.

FIG. 6 diagrammatically shows an integrated heat pump installation which, in heating mode, operates with two-stage expansion. The actual uptake of heat by the refrigeration circuit during heating is from the outside air. After compression, the refrigerant passes, at a high pressure and temperature, into the switching valve 13, which is switched to the cooling or heating operating mode. If the valve 13 is switched to the cooling operating mode, the refrigerant dissipates heat to the environment via the gas cooler (14) and is cooled further in the high-pressure part of the interior heat exchanger (15). After it has passed through the non-return valve (6), the refrigerant is expanded to evaporation pressure in the first expansion valve (16). The operating point is in the two-phase region. In the evaporator 5, it takes heat from the air flow for the vehicle cabin, which is cooled as a result. The refrigerant then flows into the collector (19). On the low-pressure side of the internal heat exchanger (15), the refrigerant is superheated and is then sucked in by the compressor (12). In the air-conditioning unit, the air stream for the cabin is cooled and the atmospheric moisture which it contains is condensed at the cold surfaces of the heat exchanger. If necessary, the air is heated by means of the heating heat exchanger 7.

If the valve 13 is switched to the heating operating mode, the refrigerant dissipates the heat to the air stream for the vehicle cabin via the gas cooler/condenser (20). After it has passed through the non-return valve (10), the refrigerant passes into the first expansion valve (16). After suitable throttling and uptake or dissipation of heat in the evaporator 5, the refrigerant flows through the collector 19 and then leaves the collector 19 with a defined refrigerant quality to the low-pressure side of the internal heat exchanger. The switching valve 21 blocks the direct route to the compressor, with the result that the medium flows through the second expansion valve 17, in which it is isenthalpically expanded to the evaporation pressure level of the heat uptake. In the condenser/gas cooler 14, heat from the environment is transferred to the refrigerant, with superheating if appropriate. The refrigerant then returns to the compressor 12 via the switching valve 21.

A particular advantage of this circuit arrangement is that the engine coolant circuit is not used to heat the cabin while the vehicle is warming up. A heat exchanger which is present in the refrigeration circuit is used for the uptake of heat. Consequently, the driving engine is heated quickly, which keeps consumption, wear and emissions at low levels.

Figure 7:
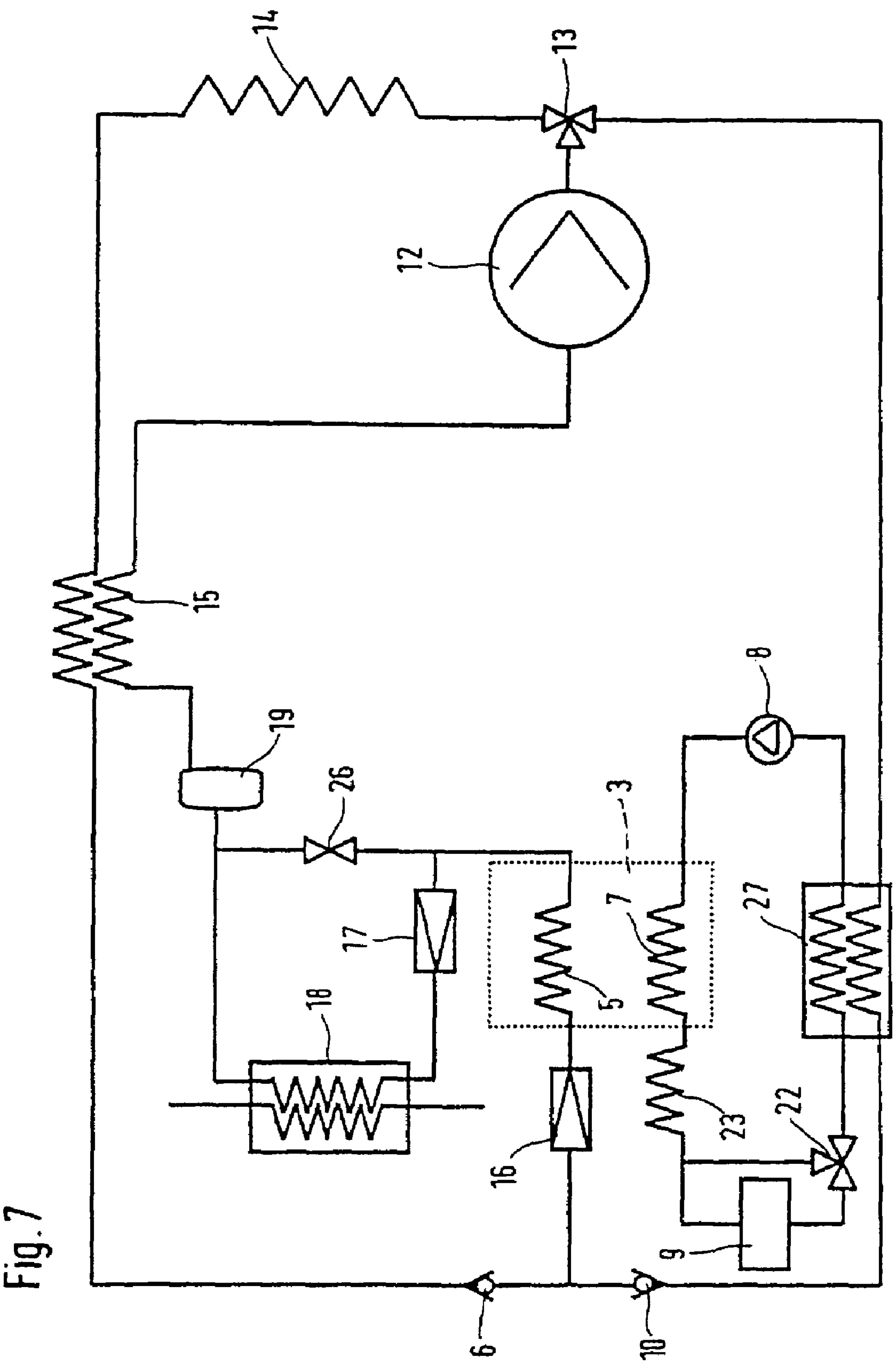
FIG. 7 diagrammatically shows an integrated heat pump installation which, in heating mode, allows two-stage expansion, transfers heat indirectly by means of a heat-transfer liquid and operates with heat being taken up from a coolant.

FIG. 7 diagrammatically shows an integrated heat pump installation.

After compression, the refrigerant passes, at a high pressure and temperature, into the switching valve 13, which is switched to the cooling or heating operating mode. If the valve 13 is switched to the cooling operating mode, the refrigerant dissipates heat to the environment via the gas cooler (14) and is cooled further in the high-pressure part of the internal heat exchanger (15). After it has passed through the non-return valve (6), the refrigerant is expanded to evaporation pressure in the first expansion valve (16). The operating point is in the two-phase region. In the evaporator 5, it takes up heat from the air flow for the vehicle cabin, which is cooled as a result. The second expansion valve (17) is not connected up and is therefore closed. The refrigerant flows via the open valve (26) into the collector (19). On the low-pressure side of the internal heat exchanger (15), the refrigerant is superheated and then sucked in by the compressor (12). In the air-conditioning unit, the air stream for the cabin is cooled, and the atmospheric moisture which it contains is condensed at the cold surfaces of the heat exchanger. If necessary, the air is heated again by means of the heating heat exchanger 7.

If the valve 13 is switched to the heating operating mode, the refrigerant dissipates the heat to the engine coolant via a refrigerant/heat-transfer fluid heat exchanger (27). After it has passed through the non-return valve (10), the refrigerant passes into the first expansion valve (16). After suitable throttling and uptake of heat or dissipation of heat in the evaporator 5, the refrigerant flows through the second expansion valve 17, in which it is isenthalpically expanded to the evaporation pressure level of the heat uptake. The valve 26 is closed. In the refrigerant/heat-transfer fluid heat exchanger 18, heat is fed to the refrigerant from the engine coolant, with superheating if appropriate. The refrigerant then flows through the collector 19, the low-pressure side of the internal heat exchanger 15, and passes to the compressor 12.

In the heating mode, the heat is transferred indirectly by means of the engine coolant. The heated engine coolant is conveyed into the heating heat exchanger (7) by means of the heating medium circulating pump (8), where it dissipates heat to the air stream for the vehicle cabin. Then, the engine coolant can flow through further heat exchangers in order to take up and dissipate heat, such as the cooler for the exhaust-gas recirculation (23). If the temperature of the engine coolant before it enters the engine is higher than that of the engine coolant in the engine, or if there is to be no flow of coolant through the engine with a view to heating up the engine, the engine coolant is passed directly to the refrigerant/engine coolant heat exchanger (27) via the valve (22). If the engine coolant in the engine is at a higher temperature than the engine coolant before it enters the engine, the engine coolant is passed through the engine in order to take up heat. An advantage of an arrangement of this type is that, with an air-side pressure drop in the air-conditioning unit, only two heat exchangers are required, with the same control of the temperature and air distribution in the cabin during heating mode using the heat pump installation and the conventional heater. The arrangement is also advantageous for vehicles with two air-conditioning units. It can limit the outlay for the heating of the vehicle interior.

The fundamental drawback of the dissipation of heat at a high temperature level can be counteracted firstly by the use of a refrigerant/heat-transfer fluid heat exchanger (27) using the countercurrent principle, and secondly in that the air in the evaporator 5 is significantly preheated on account of the energy remaining in the refrigerant. Of course, this option can only be utilized if the air-side surface of the evaporator 5 is dry.

If the air-side surface of the evaporator 5 is not dry, the heat exchanger can be heated and the water vapor formed can be passed out of the air-conditioning unit into the open air by means of a partial air stream.

Figure 8:
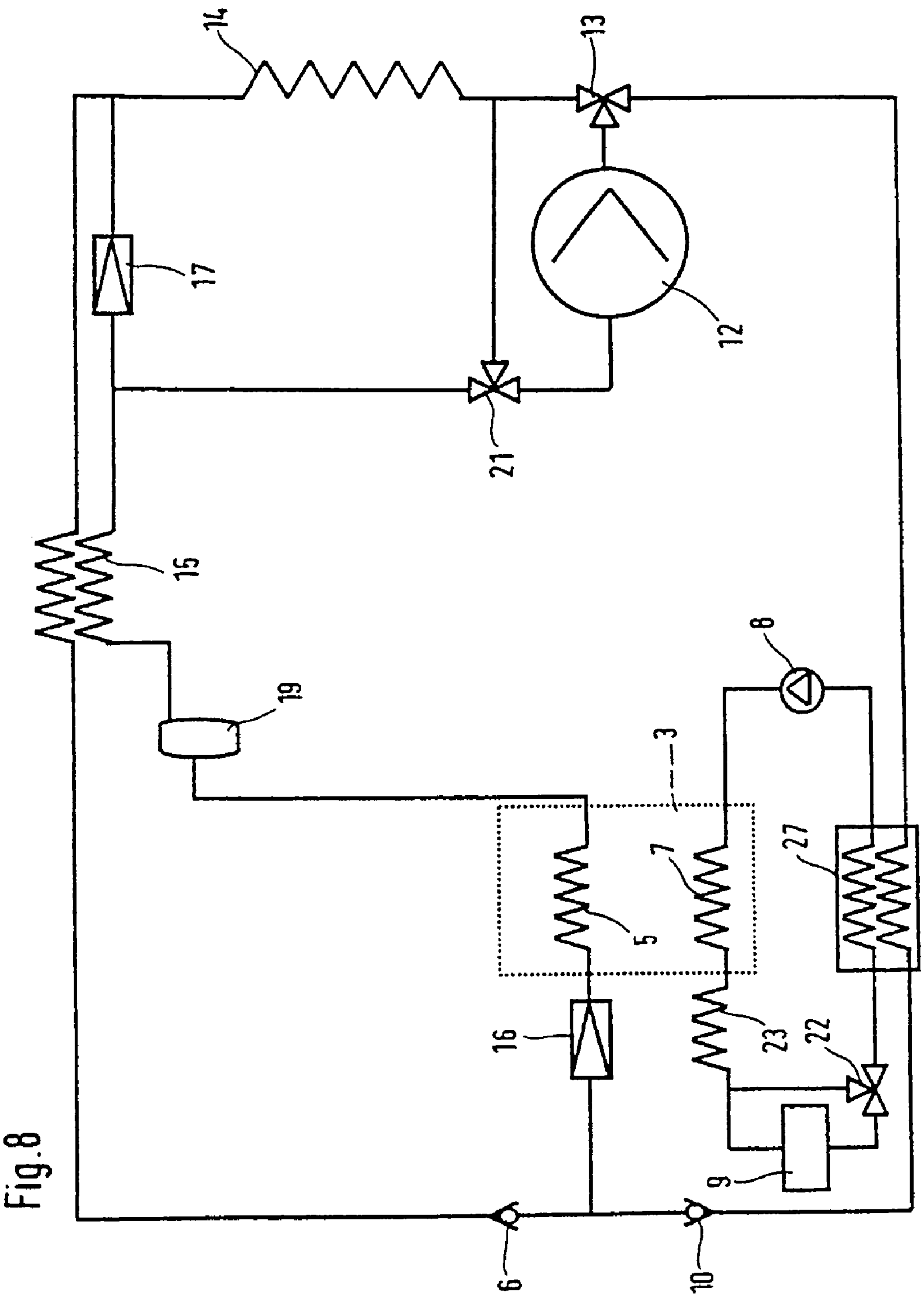
FIG. 8 diagrammatically shows an integrated heat pump installation which, in a heating mode, allows two-stage expansion, transfers heat indirectly by means of a heat-transfer liquid and operates with heat being taken up from the ambient air.

FIG. 8 diagrammatically shows an integrated heat pump installation which operates with two-stage expansion during heating. The actual uptake of heat in the refrigeration circuit during heating is from the outside air.

After the compression, the refrigerant passes at a high pressure and temperature into the switching valve 13, which switches between the cooling and heating operating modes. If the valve 13 is switched to the cooling operating mode, the refrigerant dissipates heat to the environment via the gas cooler (14) and is cooled further in the high-pressure part of the interior heat exchanger (15). After it has passed through the non-return valve (6), the refrigerant is expanded to evaporation pressure in the first expansion valve (16). The operating point is in the two-phase region. In the evaporator 5, it takes heat from the air stream for the vehicle cabin, which is cooled as a result. The refrigerant flows into the collector (19). On the low-pressure side of the interior heat exchanger (15), the refrigerant is superheated and then sucked in by the compressor (12). In the air-conditioning unit, the air stream for the cabin is cooled, and the atmospheric moisture which it contains is condensed at the cold surfaces of the heat exchangers. If necessary, the air is heated by means of the heating heat exchanger 7.

If the valve 13 has been switched to the heating operating mode, the refrigerant dissipates the heat to the engine coolant via a refrigerant/engine coolant heat exchanger (27). After it has passed through the non-return valve (10), the refrigerant passes into the first expansion valve (16). After suitable throttling and uptake or dissipation of heat in the evaporator 5, the refrigerant flows through the collector 19 and then leaves the collector 19 with a defined refrigerant quality to the low-pressure side of the internal heat exchanger. The switching valve 21 blocks the direct route to the compressor, and consequently the medium flows through the second expansion valve 17, in which it is isenthalpically expanded to the evaporation pressure level of the heat uptake. In the condenser/gas cooler 14, heat is fed to the refrigerant from the environment, with superheating if appropriate. The refrigerant then passes back to the compressor 12 via the switching valve 21.

A particular advantage of this circuit is that heat taken by the heat pump from the outside air, and therefore the engine coolant circuit is heated particularly quickly, which offers advantages with regard to consumption, wear and emissions.

Figure 9:
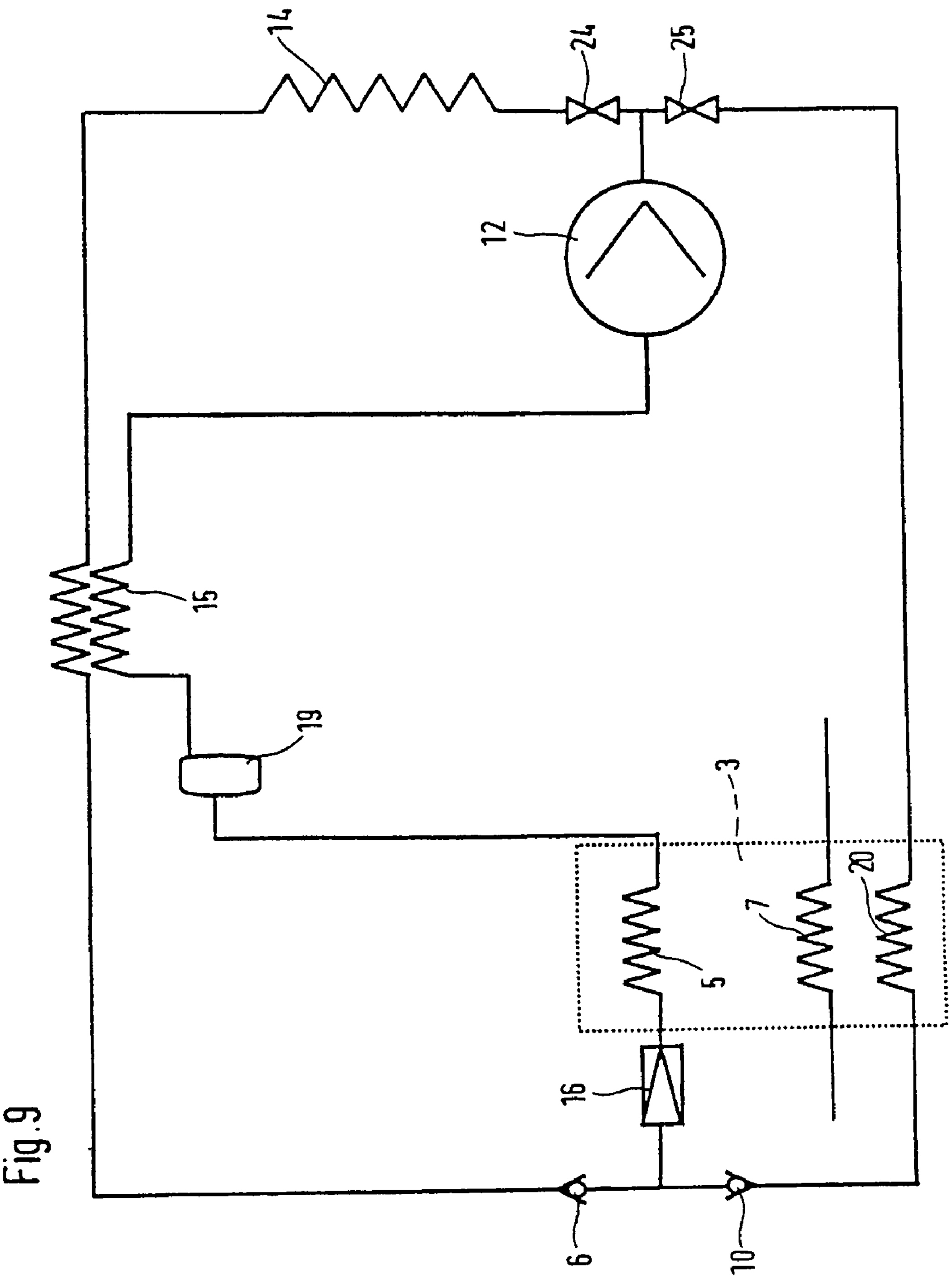
FIG. 9 diagrammatically shows an integrated heat pump installation which, in a heating mode, provides for expansion in two stages and operates with heat being taken up from the cabin air.

FIG. 9 diagrammatically shows an integrated heat pump installation. After the compression, the refrigerant is present at a high pressure and temperature upstream of the switching valves 24 and 25. If the valve 24 is opened, the refrigerant dissipates heat to the environment via the gas cooler (14) and is cooled further in the high-pressure part of the interior heat exchanger (15). After it has passed through the non-return valve (6), the refrigerant is expanded to evaporation pressure in the first expansion valve (16). The operating point is in the two-phase region. In the evaporator 5, it takes heat from the air stream for the vehicle cabin, which is cooled as a result. The refrigerant flows into the collector (19). On the low-pressure side of the interior heat exchanger (15), the refrigerant is superheated and then sucked in by the compressor (12). In the air-conditioning unit, the air stream for the cabin is cooled, the atmospheric moisture which it contains is condensed at the cold surfaces of the heat exchangers. If necessary, the air is heated by means of the heating heat exchanger 7.

If the valve 25 is opened the refrigerant dissipates the heat to a gas cooler/condenser 20. After it has passed through the non-return valve (10), the refrigerant passes into the expansion valve 16. After suitable throttling and uptake of heat in the refrigeration circuit in the evaporator 5, the refrigerant flows through the collector 19 and leaves the collector 19 with a defined refrigerant quality via the low-pressure side of the interior heat exchanger to the compressor 12.

A particular advantage of this circuit is that the heat pump withdraws heat from the air stream of the cabin air, and therefore the engine coolant circuit is heated particularly quickly, which offers advantages with regard to consumption, wear and emissions. The heating power of this installation is limited by the heat which can be removed from the feed air for the cabin and the compressor power introduced.

Figure 10:
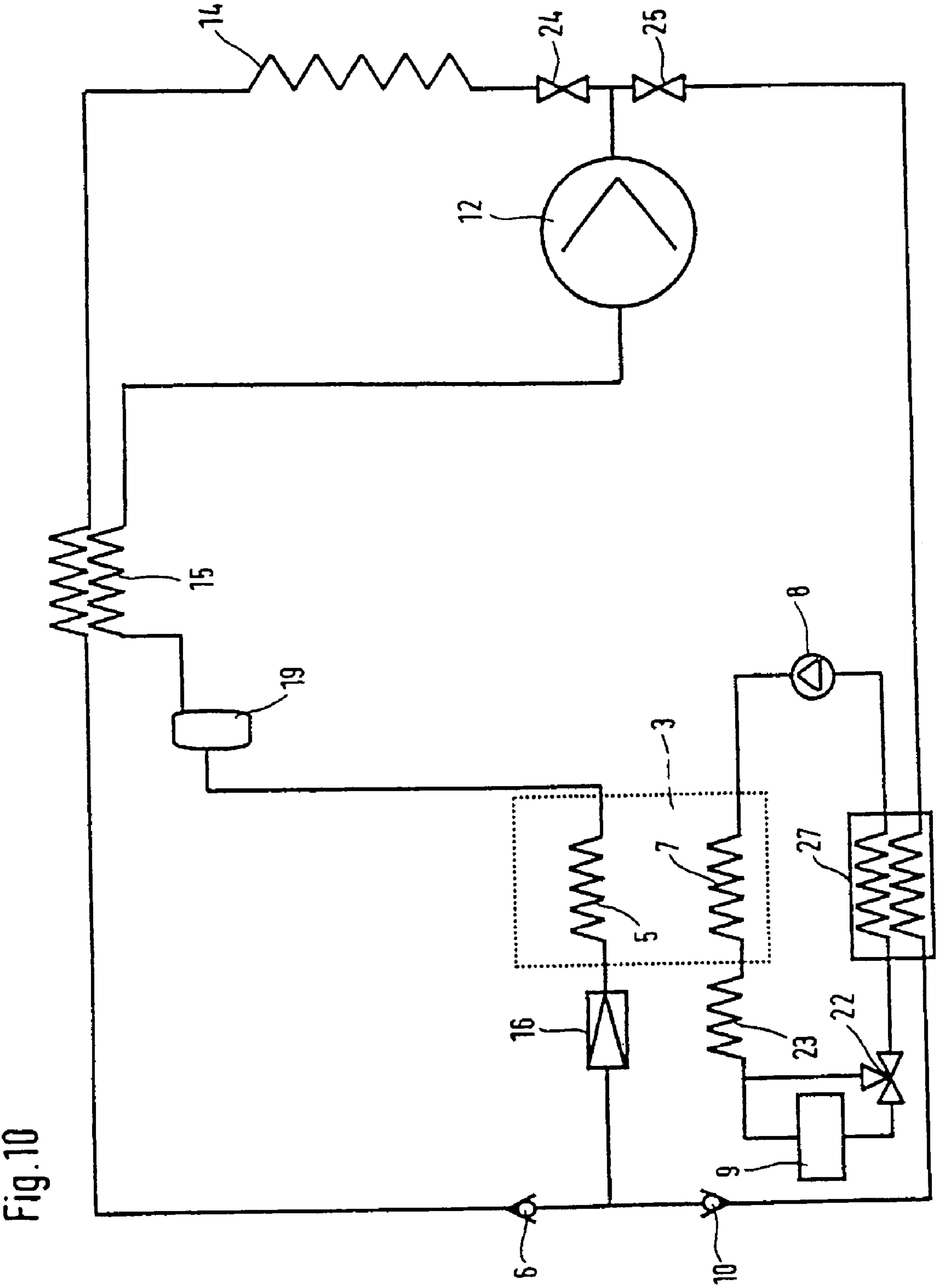
FIG. 10 diagrammatically shows an integrated heat pump installation which, in a heating mode, provides for two-stage expansion, transfers heat indirectly by means of a heat-transfer liquid and operates with heat being taken up from the cabin air.

FIG. 10 diagrammatically shows an integrated heat pump installation.

After compression, the refrigerant is present at a high pressure and temperature upstream of the switching valves 24 and 25. If the valve 24 is opened, the refrigerant dissipates heat to the environment via the gas cooler (14) and is cooled further in the high-pressure part of the interior heat exchanger (15). After it has passed through the non-return valve (6), the refrigerant is expanded to evaporation pressure in the first expansion valve (16). The operating point is in the two-phase region. In the evaporator 5, it takes heat from the air stream for the vehicle cabin, which is cooled as a result. The refrigerant flows into the collector (19). On the low-pressure side of the interior heat exchanger (15), the refrigerant is superheated and then sucked in by the compressor (12). In the air-conditioning unit 3, the air stream for the cabin is cooled, and the atmospheric moisture which it contains is condensed at the cold surfaces of the heat exchangers. If necessary, the air is heated by means of the heating heat exchanger 7.

If the valve 25 is opened, the refrigerant dissipates the heat to the engine coolant via a refrigerant/engine coolant heat exchanger (27). After it has passed through the non-return valve (10), the refrigerant passes into the expansion valve 16. After suitable throttling and uptake of heat by the refrigeration circuit in the evaporator 5, the refrigerant flows through the collector 19 and leaves the collector 19 with a defined refrigerant quality via the low-pressure side of the interior heat exchanger to the compressor 12.

A particular advantage of this circuit is that the uptake of heat by the heat pump is from the air stream of the cabin air and the energy is introduced into the engine coolant circuit. A further benefit is produced in the cooling operating mode. In the event of the vehicle being started up with a heated vehicle interior compartment, it is possible for very considerable amounts of heat fluxes to be dissipated into the engine coolant for a brief period of time. This provides a considerable refrigeration capacity. This circuit mode is suitable whenever the engine coolant temperature is less than 40° C. Furthermore, as a result, the drive engine is advantageously heated.

Figure 11:
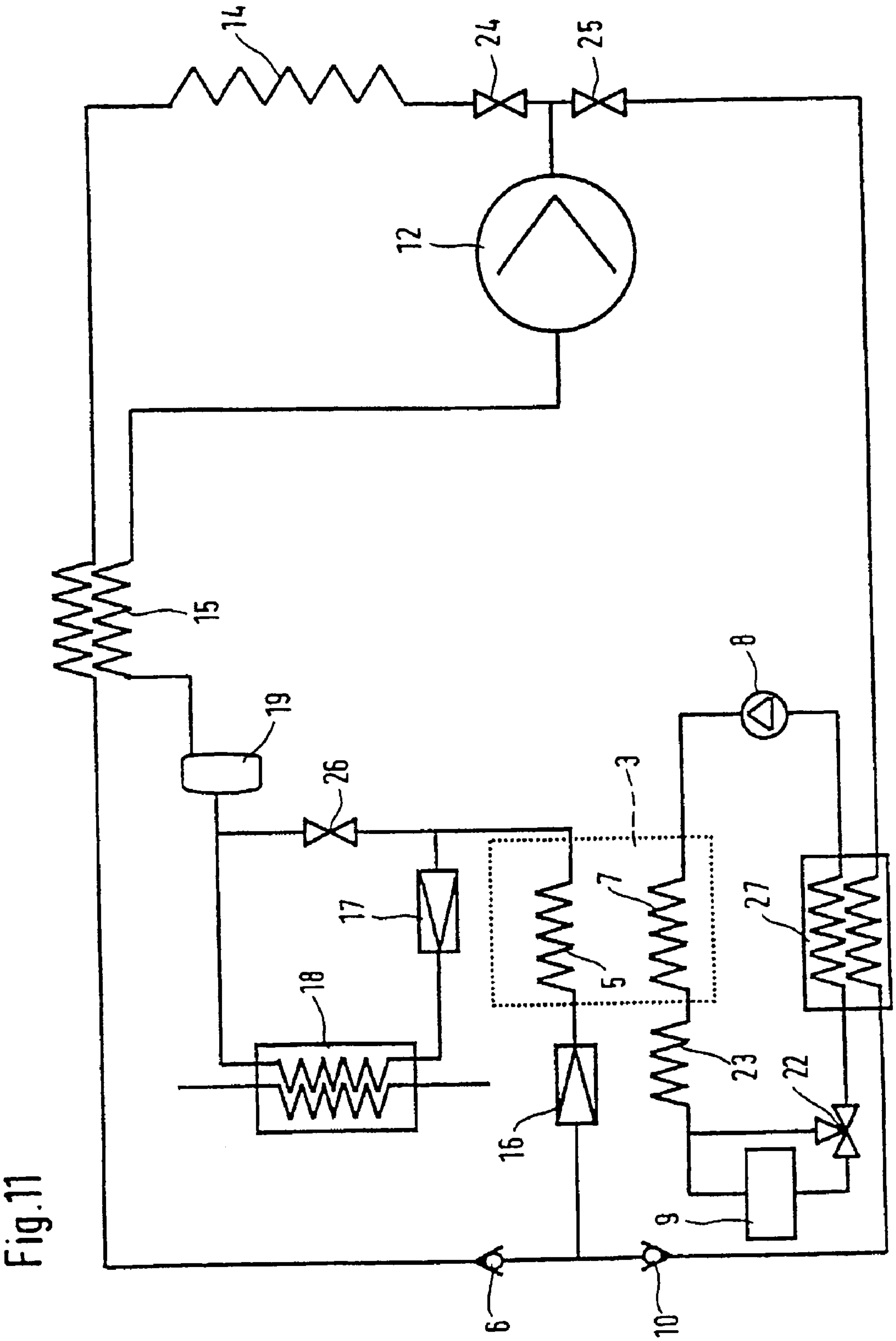
FIG. 11 diagrammatically shows an integrated heat pump installation which, in a heating mode, allows two-stage expansion, transfers heat indirectly by means of a heat-transfer liquid and operates with heat being taken up from the coolant.

FIG. 11 shows the circuit from FIG. 7, except that the switchover valve 13 has been replaced by two shut-off valves 24 and 25. Consequently, after the vehicle has been started with a heated interior compartment, very considerable heat fluxes can be dissipated into the engine coolant for a brief period of time. This provides a considerable refrigeration capacity. This circuit is suitable whenever the engine coolant temperature is less than 40° C. The driving engine is advantageously heated as a result.

Figure 12:
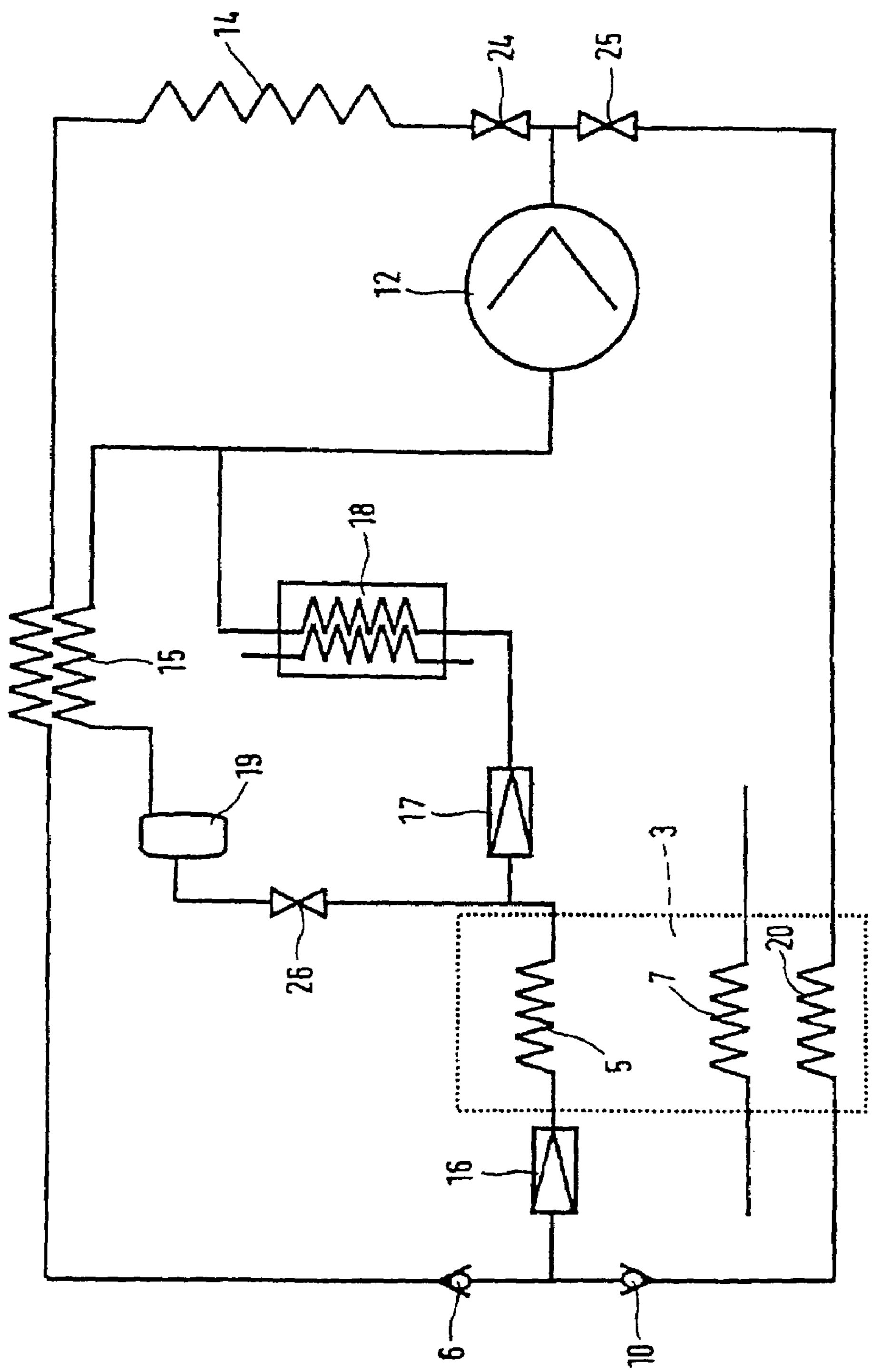
FIG. 12 diagrammatically shows an integrated heat pump installation which, in heating mode, provides for two-stage expansion and operates with heat being taken up from the coolant.

FIG. 12 diagrammatically shows an integrated heat pump installation.

After compression, the refrigerant is present at high pressure and temperature upstream of the switching valves 24 and 25. If the valve 24 is opened, the refrigerant dissipates heat to the environment via the gas cooler (14), and is cooled further in the high-pressure part of the internal heat exchanger (15). After it has passed through the non-return valve (6), the refrigerant is expanded to evaporation pressure in the first expansion valve (16). In the evaporator 5, it takes heat from the air stream for the vehicle cabin, which is cooled as a result. The second expansion valve (17) is not connected into the circuit and is therefore closed. The refrigerant flows into the collector (19) via the open valve (26). On the low-pressure side of the interior heat exchanger (15), the refrigerant is superheated and is then sucked in by the compressor (12). In the air-conditioning unit, the air stream for the cabin is cooled, and the atmospheric moisture which it contains is condensed at the cold surfaces of the heat exchangers. If necessary, the air is heated by means of the heating heat exchanger 7.

If the valve 25 is opened, the refrigerant dissipates the heat to a gas cooler/condenser 20. After it has passed through the non-return valve (10), the refrigerant passes into the expansion valve 16. After suitable throttling and uptake or dissipation of heat in the evaporator 5, the refrigerant flows through the second expansion valve 17, in which it is isenthalpically expanded to the evaporation pressure level of the heat uptake. Valve 26 is closed. In the refrigerant/heat-transfer fluid heat exchanger 18, heat is fed to the refrigerant from the engine coolant, with superheating if appropriate, and the refrigerant then returns to the compressor 12. The collector 19 and the low-pressure side of the interior heat exchanger 15 do not have circulating refrigerant flowing through them but are in communication with the compressor inlet.

With this circuit arrangement, in the heating mode, the circulating refrigerant does not flow through the collector and the low-pressure side of the internal heat exchanger (15). Since with the operating characteristics of the collector under normal circumstances some liquid refrigerant is always carried out when the refrigerant flows through the collector, superheating at the compressor inlet is negatively affected, which manifests itself in lower compressor outlet temperatures. As a result, the maximum performance of the heat pump is not normally achieved. Furthermore, the pressure drop which occurs on the suction side is significantly lower. Since this circuit does not have these features, it represents an advantageous application.

Figure 13:
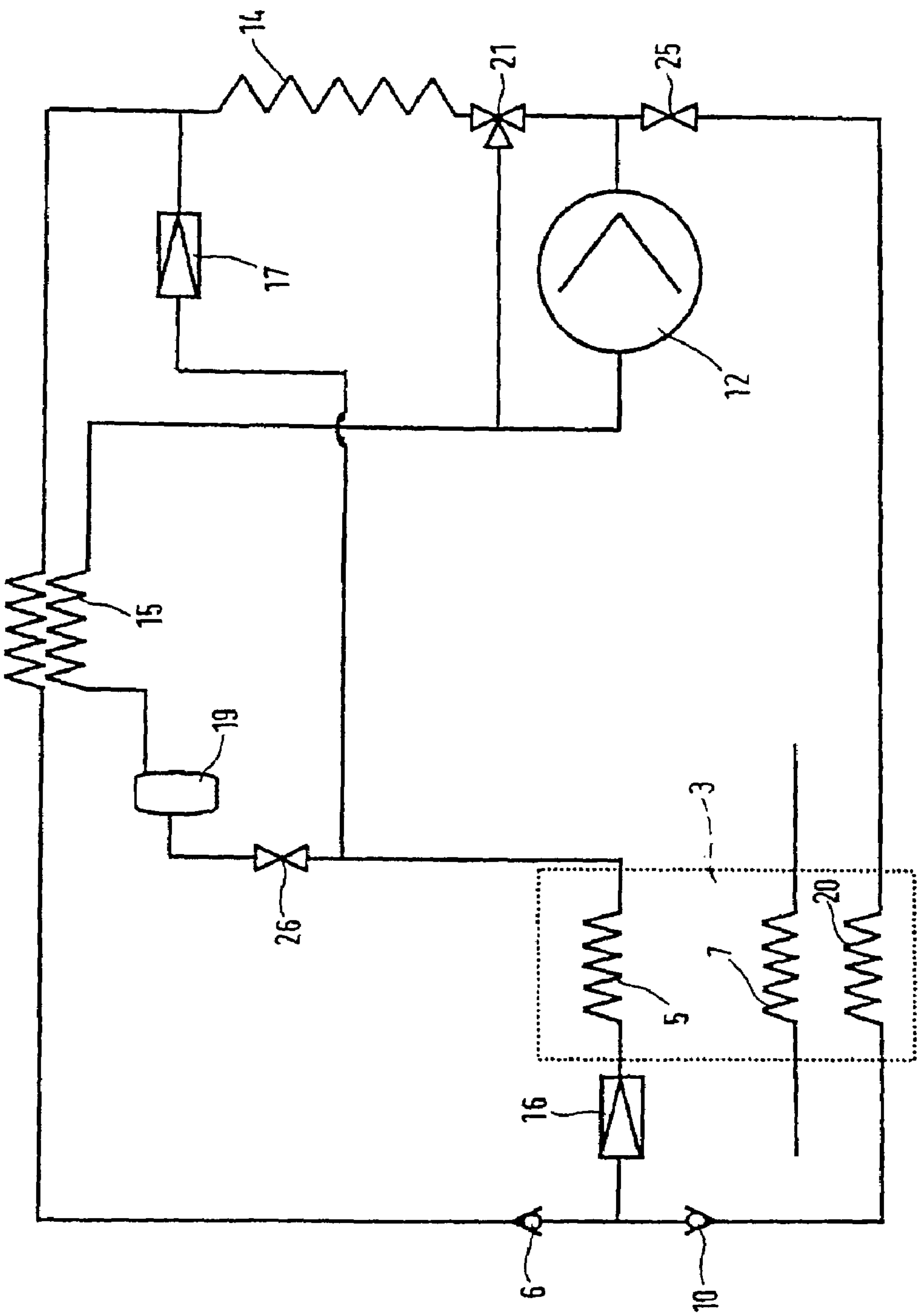
FIG. 13 diagrammatically shows an integrated heat pump installation which, in heating mode, provides for two-stage expansion and operates with heat being taken up from the air.

FIG. 13 diagrammatically shows an integrated heat pump installation which, during heating mode, operates with two-stage expansion.

After the compression, the refrigerant is present at a high pressure and temperature upstream of the switching valves 21 and 25. If the valve 21 is open, the refrigerant dissipates heat to the environment via the gas cooler (14) and is cooled further in the high-pressure part of the interior heat exchanger (15). After it has passed through the non-return valve (6), the refrigerant is expanded to evaporation pressure in the first expansion valve (16). The operating point is in the two-phase region. In the evaporator 5, it takes heat from the air stream for the vehicle cabin, which is cooled as a result. The refrigerant flows into the collector (19). On the low-pressure side of the interior heat exchanger (15), the refrigerant is superheated and then sucked in by the compressor (12). In the air-conditioning unit, the air stream for the cabin is cooled, and the atmospheric moisture which it contains is condensed at the cold surfaces of the heat exchangers. If necessary, the air is heated by means of the heating heat exchanger 7.

If the valve 25 is opened, the refrigerant dissipates the heat to the air stream for the vehicle cabin at a gas cooler/condenser 20. After it has passed through the non-return valve (10), the refrigerant passes into the first expansion valve (16). After suitable throttling and uptake or transfer of heat in the evaporator 5, the refrigerant flows through the second expansion valve 17, in which it is isenthalpically expanded to the evaporation pressure level of the heat uptake. The switching valve 26 blocks the route to the collector 19. In the condenser/gas cooler 14, heat from the environment is fed to the refrigerant, with superheating if appropriate. The refrigerant then returns to the compressor 12 via the switching valve 21.

A particular advantage of this circuit arrangement is that while the vehicle is warming up the engine coolant circuit is not used to heat the cabin.

A heat exchanger which is present in the refrigeration circuit is used for the uptake of heat. As a result, the driving engine is heated up quickly, which offers benefits with regard to consumption, wear and emissions.

Figure 14:
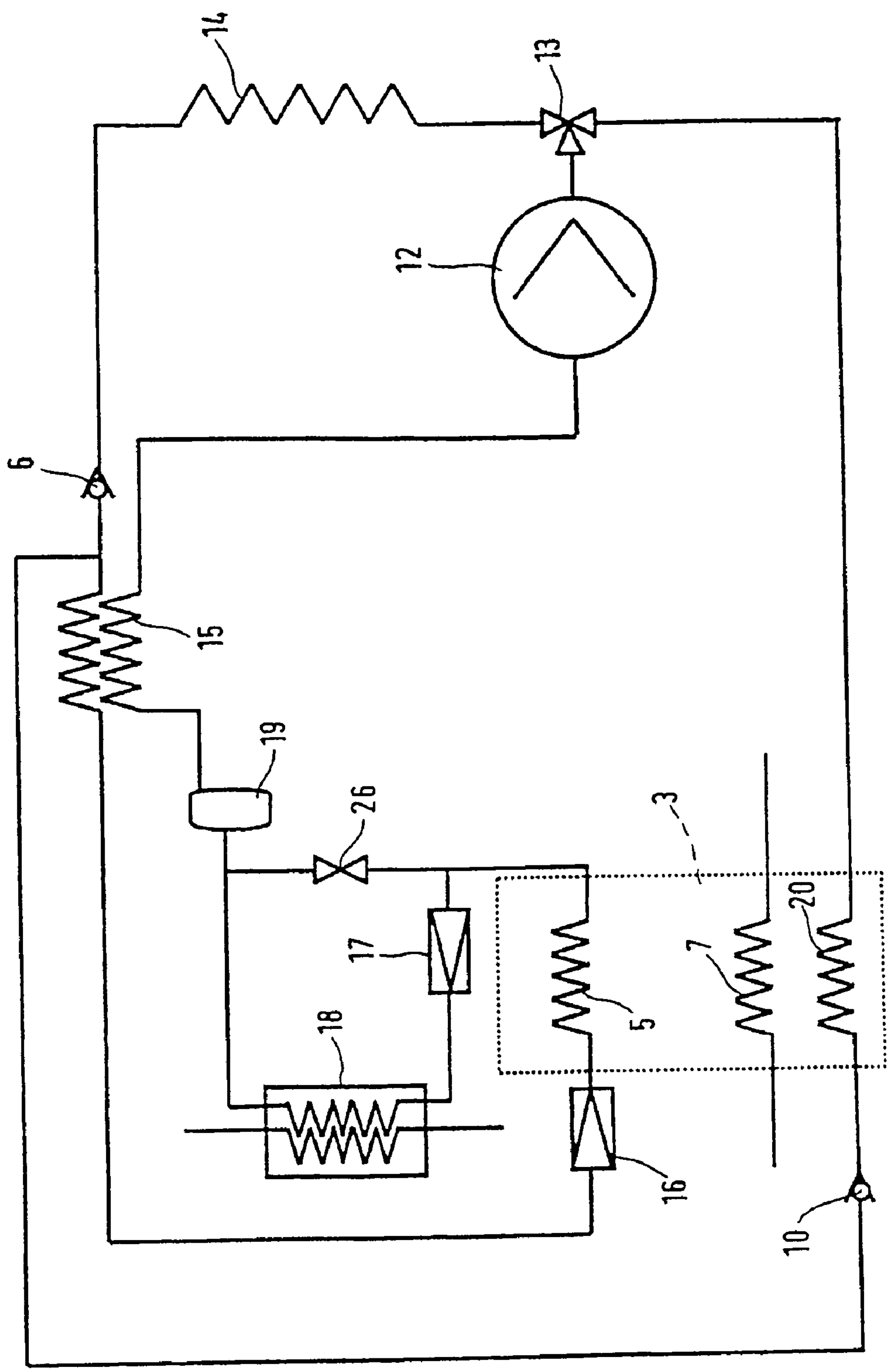
FIG. 14 diagrammatically shows an integrated heat pump installation which, in heating mode, provides for two-stage expansion and operates with heat being taken up from the coolant.

FIG. 14 diagrammatically shows an integrated heat pump installation.

After the compression, the refrigerant passes at a high pressure and temperature into the switching valve 13, which switches between the cooling and heating operating modes. If the valve 13 is switched to the cooling operating mode, the refrigerant dissipates heat to the environment via the gas cooler (14) and is cooled further in the high-pressure part of the interior heat exchanger (15). After it has passed through the non-return valve (6), the refrigerant is expanded to evaporation pressure in the first expansion valve (16). The second expansion valve (17) is not connected into the circuit and is therefore closed. The refrigerant flows via the open valve (26) into the collector (19). On the low-pressure side of the internal heat exchanger (15), the refrigerant is superheated and then sucked in by the compressor (12). In the air-conditioning unit, the air stream for the cabin is cooled, and the atmospheric moisture which it contains is condensed at the cold surfaces of the heat exchangers. If necessary, the air is heated by means of the heating heat exchanger 7.

If the valve 13 is switched to the heating operating mode, the refrigerant dissipates the heat to the air stream for the vehicle cabin via gas cooler/condenser 20. After it has passed through the non-return valve 10, the refrigerant is conducted to the entry of the high-pressure side of the internal heat exchanger 15 and then into the first expansion valve 16. The non-return valve 6 prevents the refrigerant from flowing back into the gas cooler 14, in which heat can be dissipated to the environment and the refrigerant contained condenses. In the process, the specific volume increases which leads to a flow of refrigerant out of the circuit. As a result, the gas cooler fills up with liquid refrigerant. After suitable throttling and uptake or dissipation of heat in the evaporator 5, the refrigerant flows through the second expansion valve 17, in which it is isenthalpically expanded to the evaporation pressure level of the heat uptake. The valve 26 is closed. In the refrigerant/heat-transfer fluid heat exchanger 18, heat is fed to the refrigerant from the engine coolant, with superheating if appropriate. The refrigerant flows through the collector 19, the low-pressure side of the interior heat exchanger 15 and passes to the compressor 12.

With this circuit arrangement, the energy which has remained in the refrigerant is used for superheating of the refrigerant by means of the internal heat exchanger 15 before it enters the compressor 12. Since in this case some of the energy remains in the circuit, to ensure that the suction gas temperatures in the compressor 12 are high, high compressor outlet temperatures are reached. Consequently, the heat is available at a high temperature.

Figure 15:
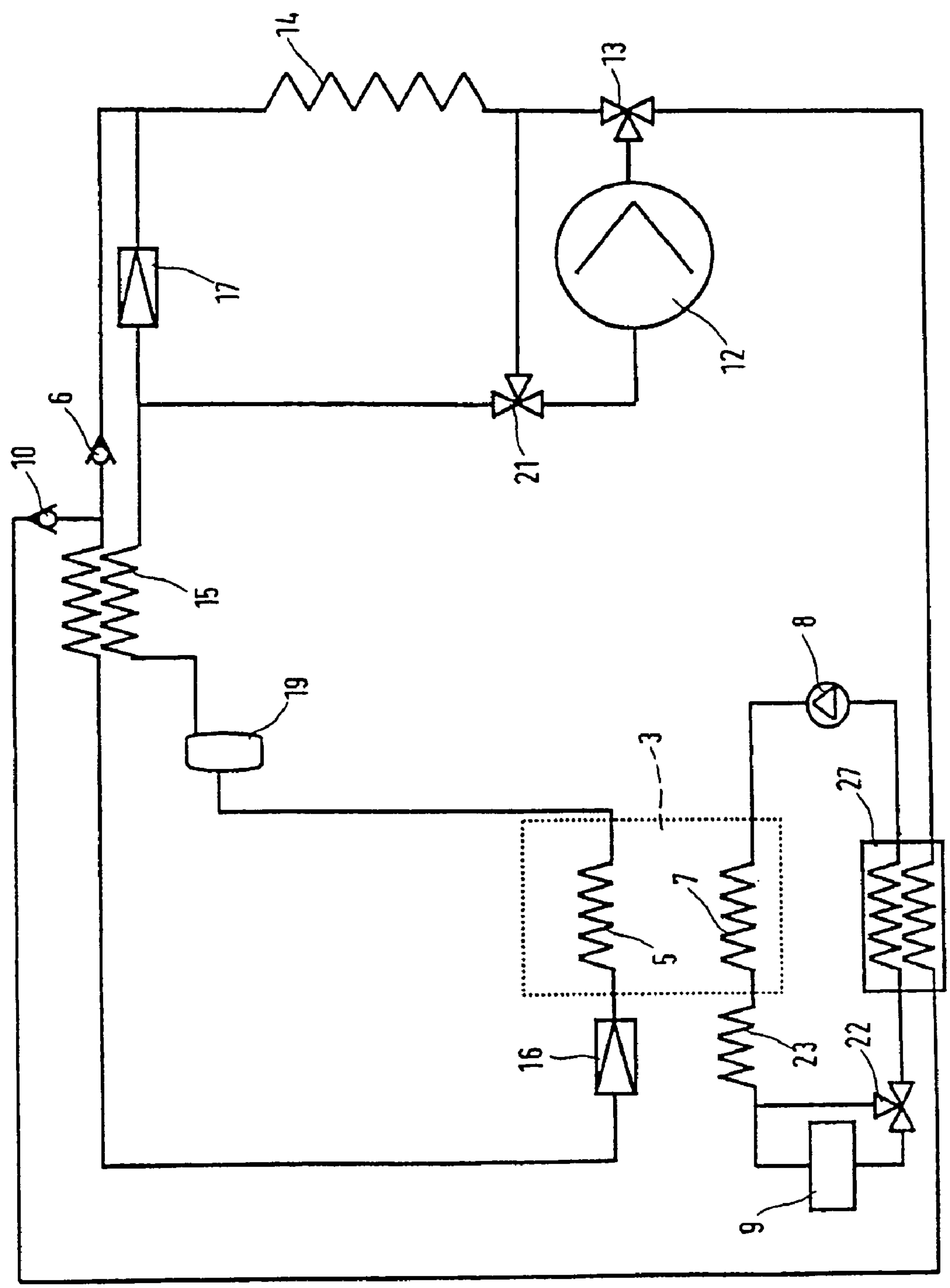
FIG. 15 diagrammatically shows an integrated heat pump installation which, in heating mode, provides for two-stage expansion, transfers heat indirectly by means of a heat-transfer liquid and operates with heat being taken up from the air.

FIG. 15 diagrammatically shows an integrated heat pump installation which operates with two-stage expansion during heating. The actual uptake of heat by the refrigeration circuit during heating is from the outside air.

After compression, the refrigerant passes at high pressure and temperature into the switching valve 13, which switches between the cooling and heating operating modes. If the valve 13 is switched to the cooling operating mode, the refrigerant dissipates heat to the environment via the gas cooler (14) and is cooled further in the high-pressure part of the interior heat exchanger (15). After it has passed through the non-return valve (6), the refrigerant is expanded to evaporation pressure in the first expansion valve (16). In the evaporator 5, it takes heat from the air stream for the vehicle cabin, which is cooled as a result. The refrigerant flows into the collector (19). On the low-pressure side of the internal heat exchanger (15), the refrigerant is superheated and is then sucked in by the compressor (12). In the air-conditioning unit, the air stream for the cabin is cooled, and the atmospheric moisture which it contains is condensed at the cold surfaces of the heat exchangers. If necessary, the air is heated by means of the heating heat exchanger 7.

If the valve 13 is switched to the heating operating mode, the refrigerant dissipates the heat to the engine coolant via a refrigerant/engine coolant heat exchanger (27). After it has passed through the non-return valve 10, the refrigerant passes to the inlet of the high-pressure side of the interior heat exchanger 15 and then into the first expansion valve 16. The non-return valve 6 prevents the refrigerant from flowing back into the gas cooler 14. After suitable throttling and uptake or dissipation of heat in the evaporator 5, the refrigerant flows through the collector 19 to the low-pressure side of the interior heat exchanger 15. The switching valve 21 blocks the direct route to the compressor, and consequently the refrigerant flows through the second expansion valve 17, in which it is isenthalpically expanded to the evaporation pressure level of the heat uptake. In the condenser/gas cooler 14, heat is fed to the refrigerant from the environment, with superheating if appropriate. The refrigerant then passes back to the compressor 12 via the switching valve 21.

Figure 16:
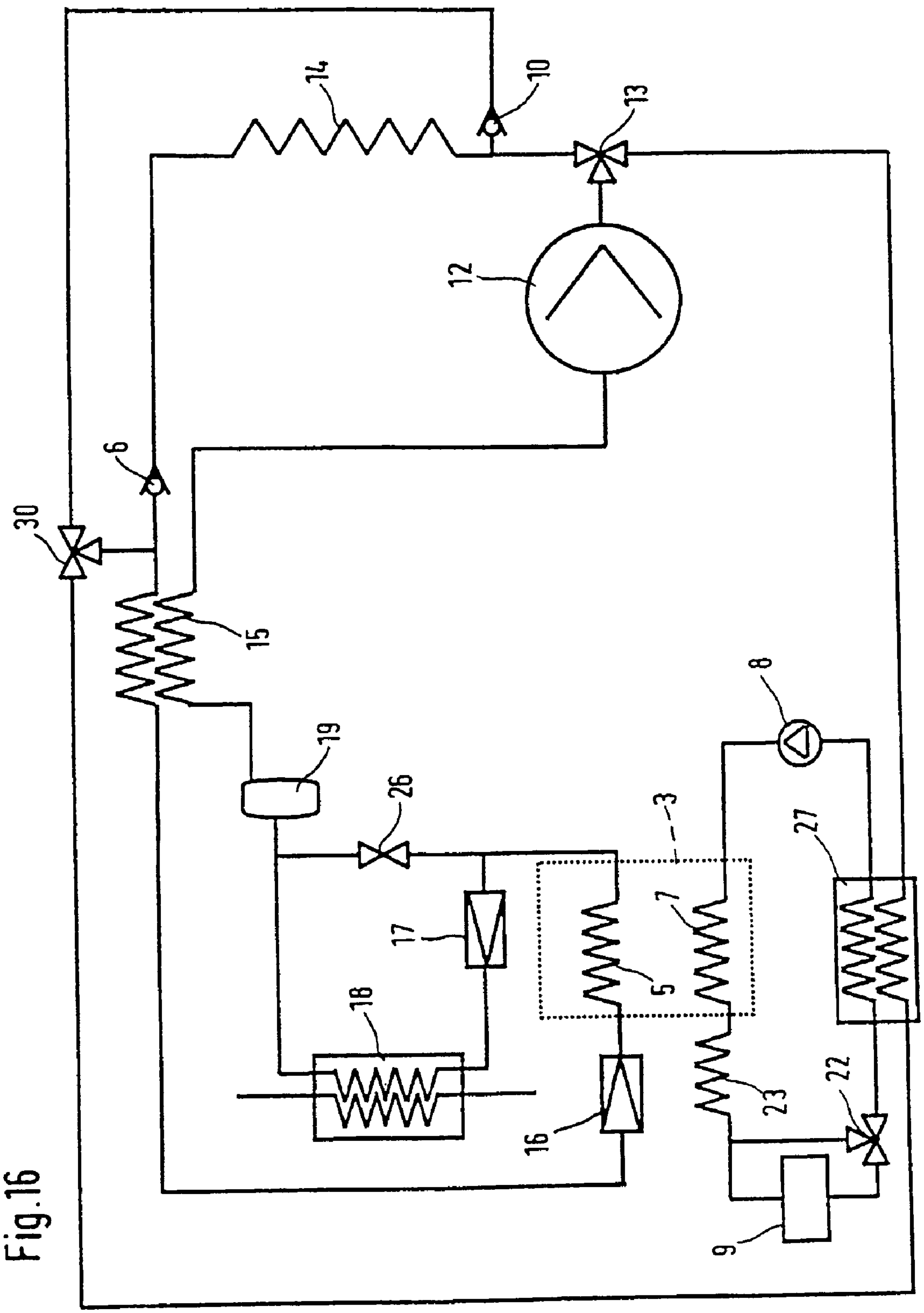
FIG. 16 diagrammatically shows an integrated heat pump installation which, in a cooling mode, transfers the heat indirectly by means of a heat-transfer liquid and then by means of outside air.
Figure 17:
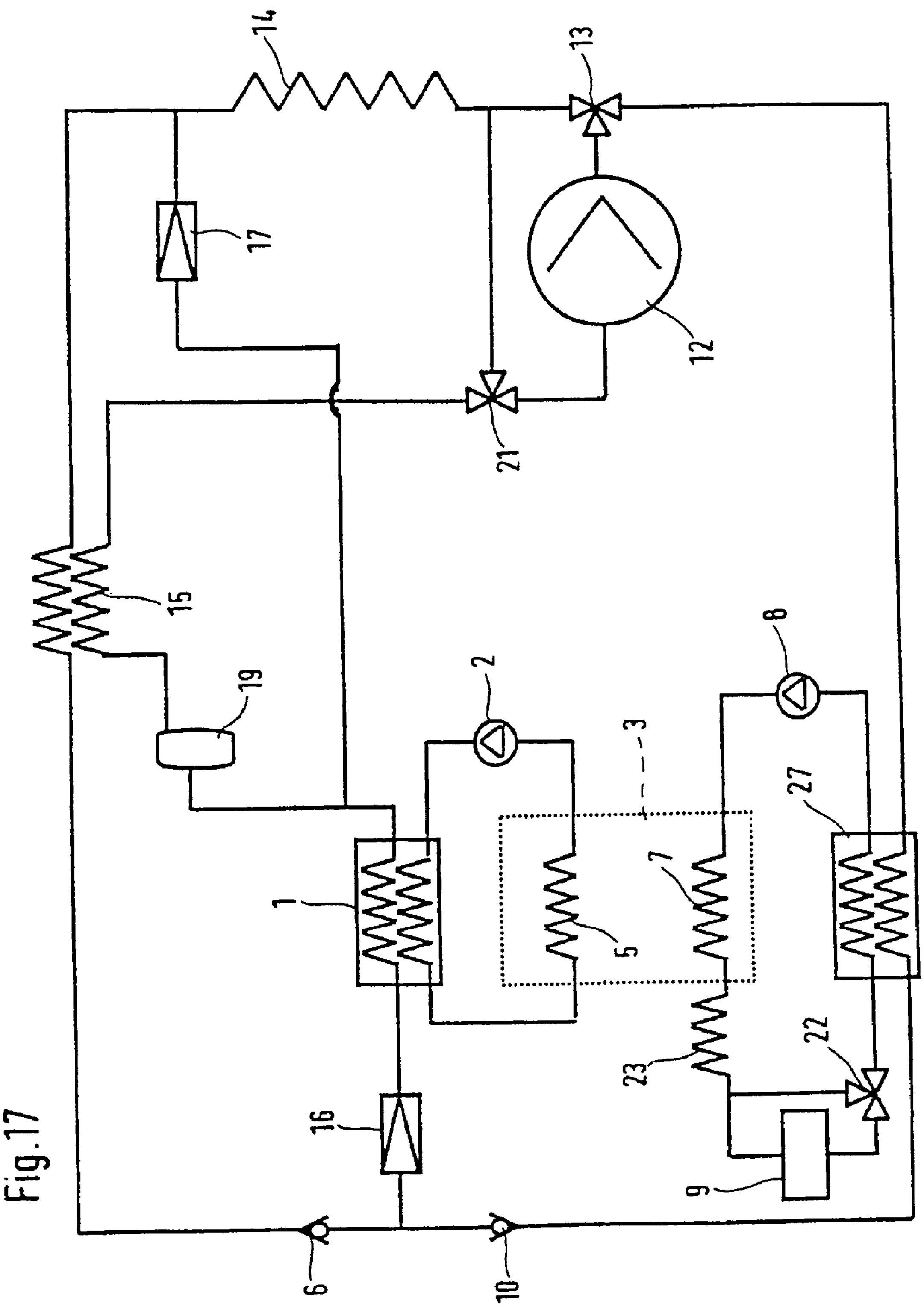
FIG. 17 diagrammatically shows an integrated heat pump installation which, in heating mode, provides for two-stage expansion, transfers heat indirectly by means of a first heat-transfer liquid, transfers heat for cooling or heating the air indirectly by means of a second heat-transfer liquid and, in heat pump mode, takes up the heat from the ambient air.
Figure 18:
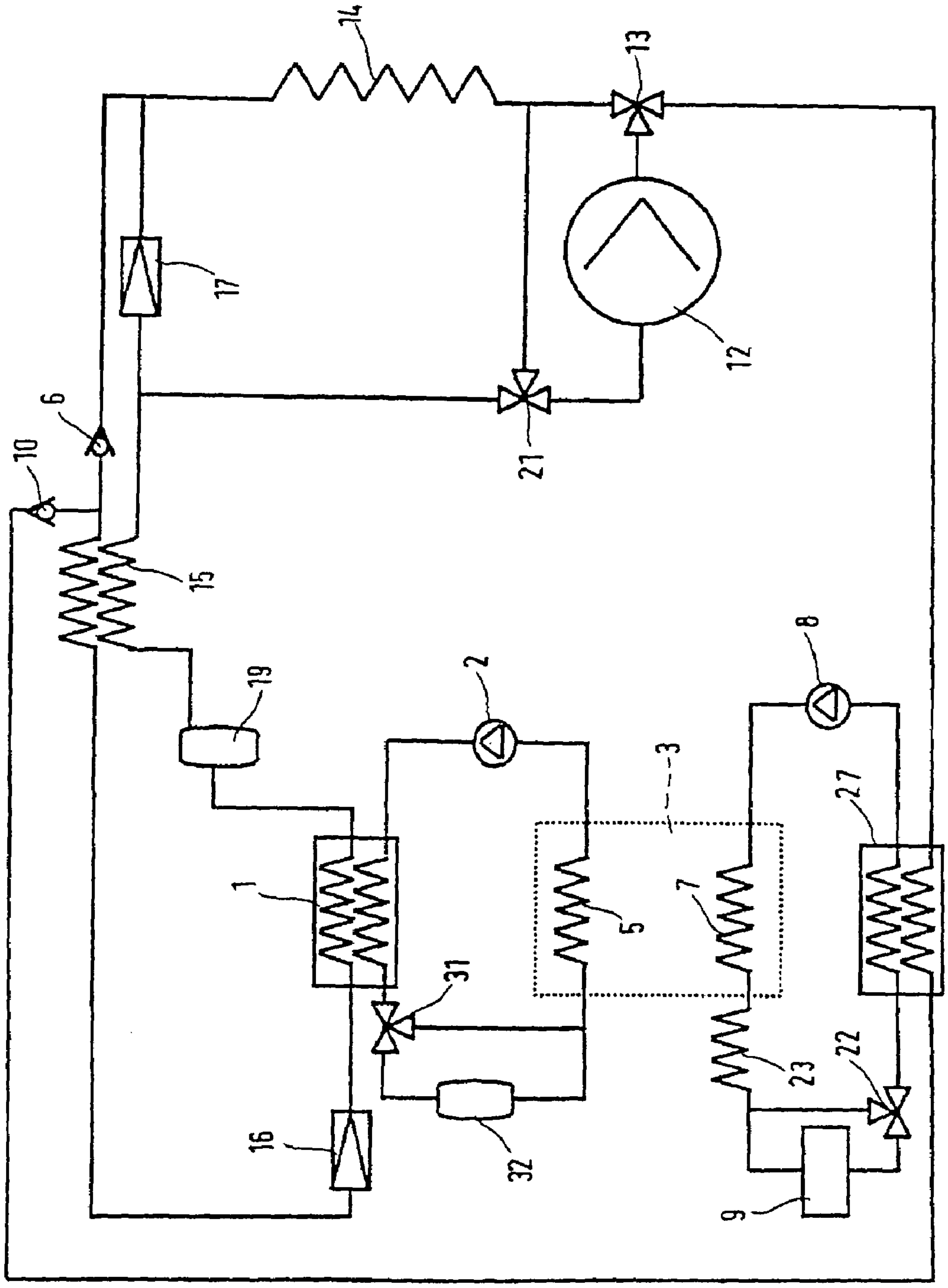
FIG. 18 diagrammatically shows an integrated heat pump installation which, in a heating mode, provides for two-stage expansion, transfers heat indirectly by means of a first heat-transfer liquid, transfers heat for cooling or heating the air indirectly by means of a second heat-transfer liquid and, in heat pump mode, takes up the heat from the ambient air.
Figure 19:
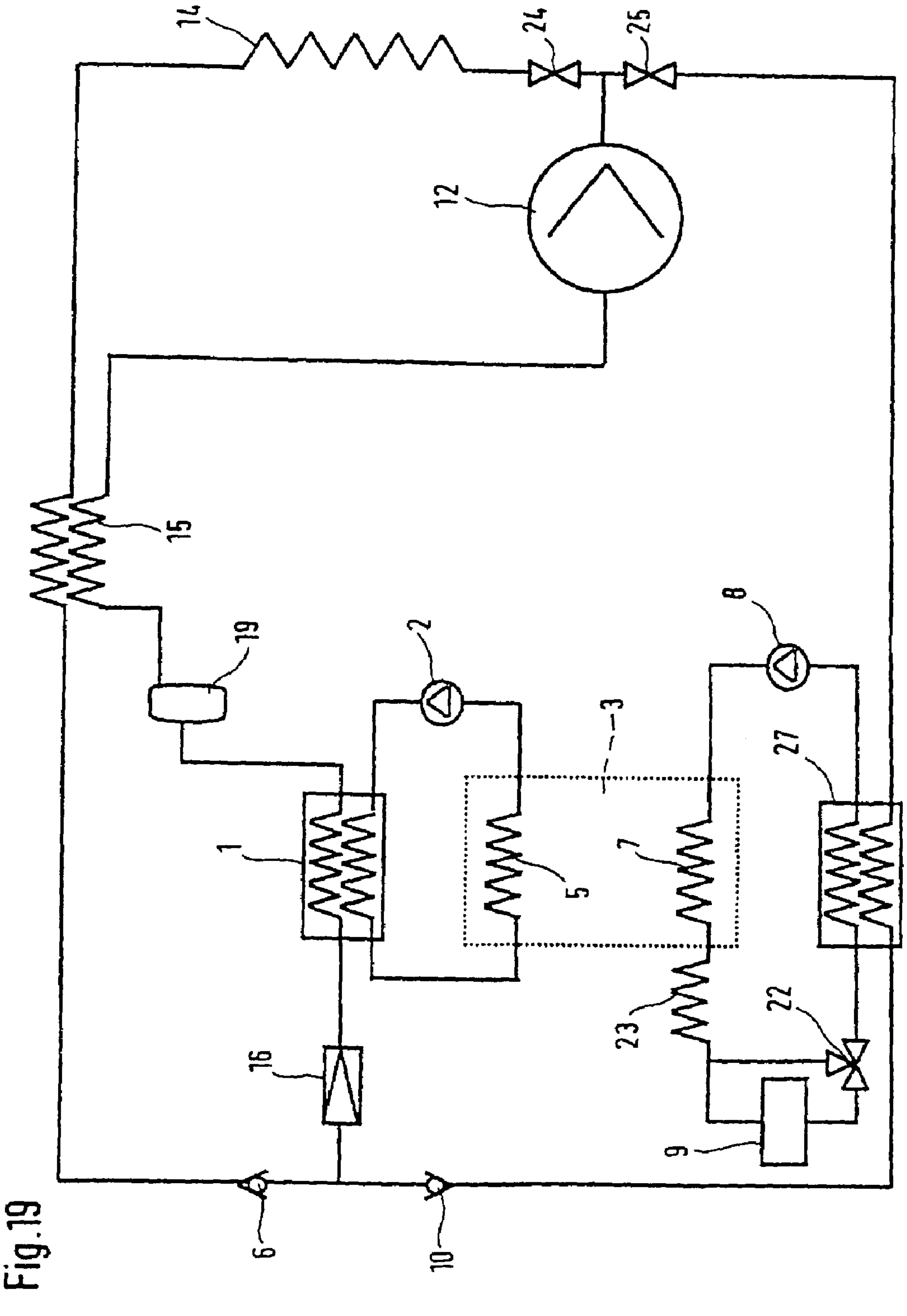
FIG. 19 diagrammatically shows an integrated heat pump installation which, in a heating mode, transfers heat indirectly by means of a first heat-transfer liquid, transfers heat for cooling or heating the air indirectly by means of a second heat-transfer liquid and, during cooling, provides for the heat to be transferred from the circuit to the first heat-transfer liquid and/or to the outside air.
Figure 20:
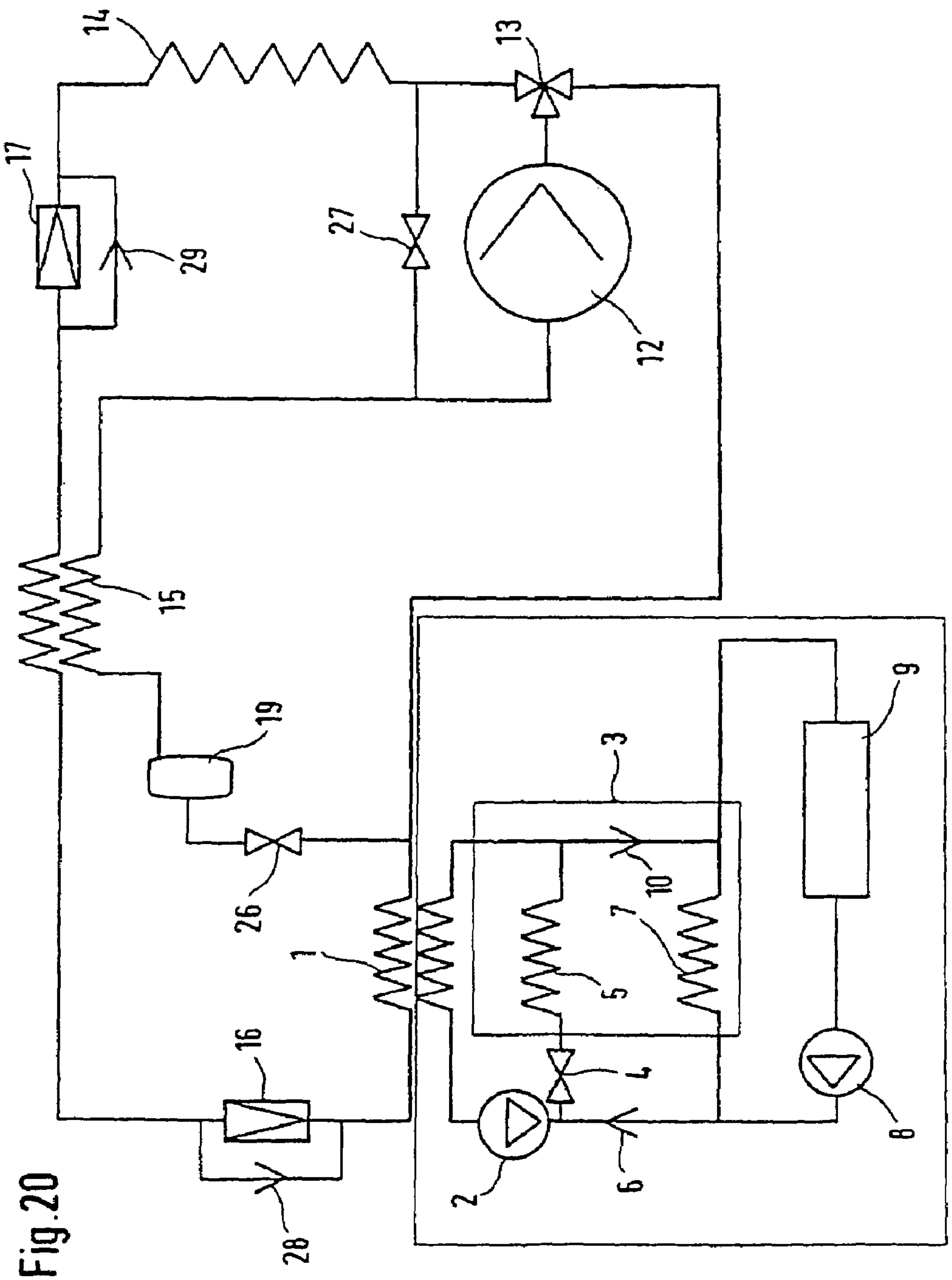
FIG. 20 diagrammatically shows an integrated heat pump installation which transfers heat for cooling or heating the air indirectly to the coolant circuit of the driving engine or indirectly to a closed subsystem of the coolant circuit and, in a heat pump mode, takes up heat from the ambient air.
Figure 21:
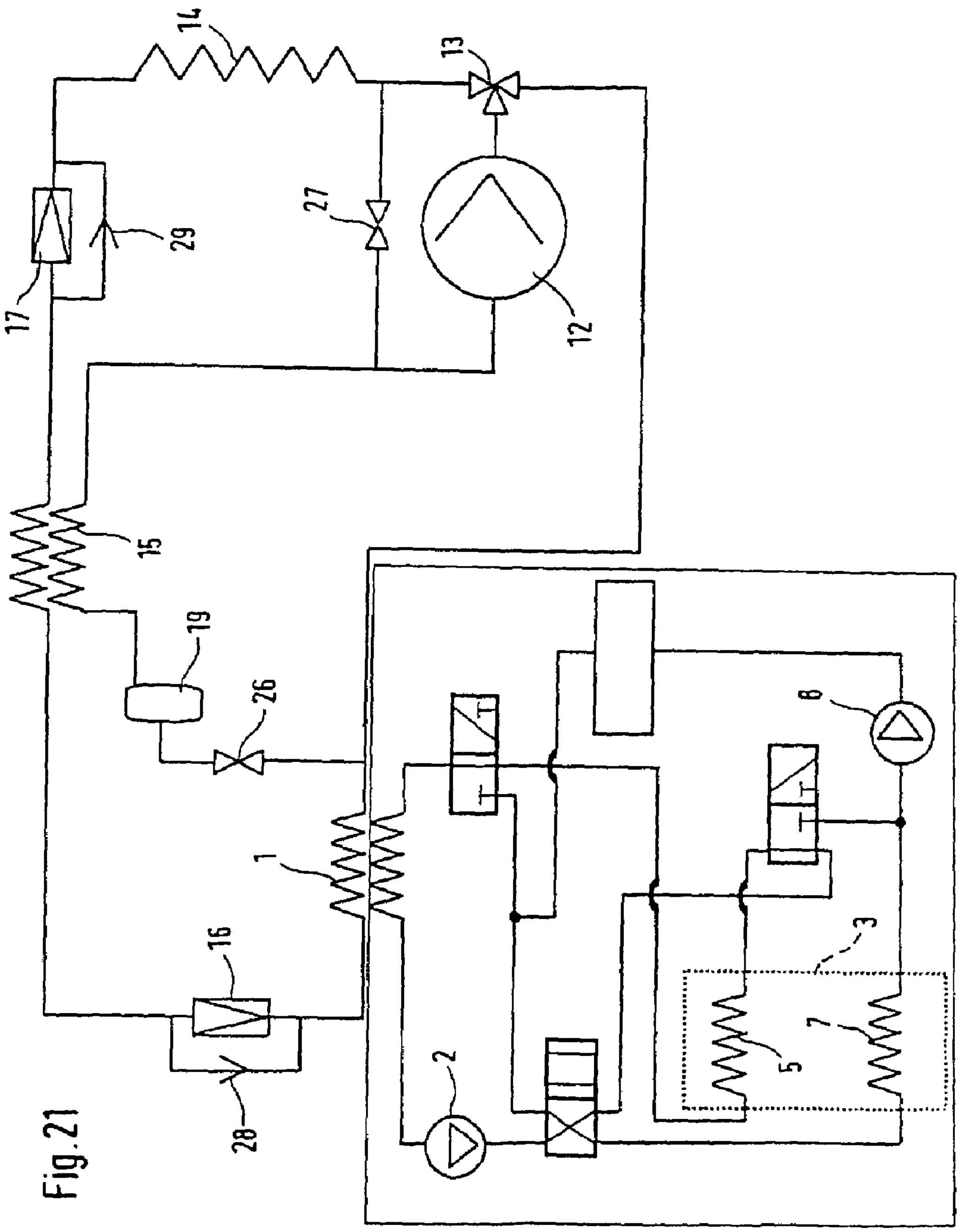
FIG. 21 diagrammatically shows an integrated heat pump installation which transfers heat for cooling or heating the air indirectly to the coolant circuit of the driving engine or indirectly to a closed subsystem of the coolant circuit and, in heat pump mode, takes up heat from the ambient air and means for the switching the coolant circuit.
Figure 22:
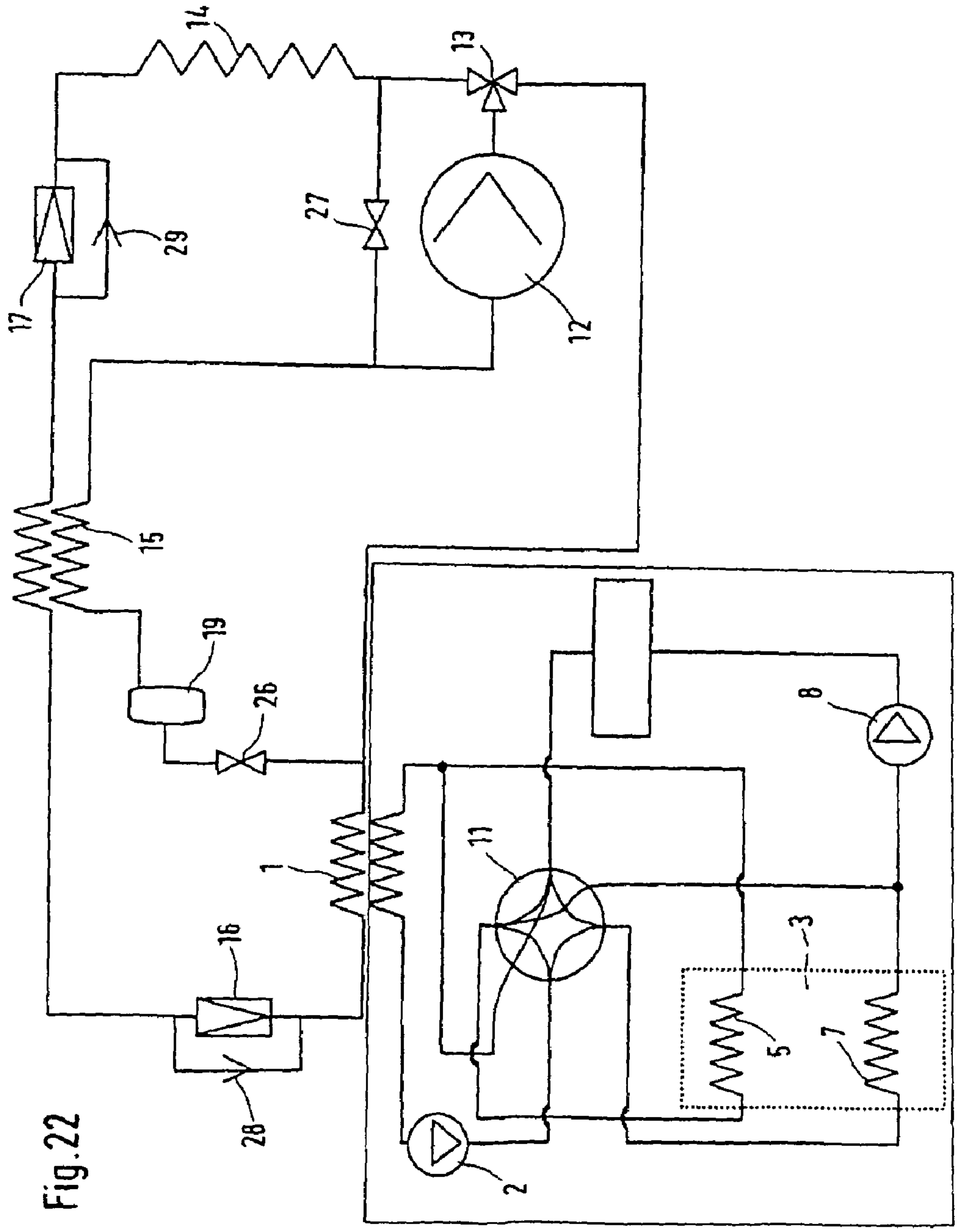
FIG. 22 diagrammatically shows an integrated heat pump installation which transfers heat for cooling or heating the air indirectly to the coolant circuit of the driving engine or indirectly to a closed subsystem of the coolant circuit and, in a heat pump mode, takes up heat from the ambient air and means for switching the coolant circuit in a switching valve unit.

FIG. 16 diagrammatically shows an integrated heat pump installation.

After compression, the refrigerant passes at a high pressure and temperature into the switching valve 13, which switches between the cooling and heating operating modes. If the valve 13 is switched to the cooling operating mode, the refrigerant dissipates heat to the environment via the gas cooler (14) and is cooled further in the high-pressure part of the interior heat exchanger (15). After it has passed through the non-return valve (6), the refrigerant is expanded to evaporation pressure in the first expansion valve (16). The second expansion valve (17) is not connected into the circuit and is therefore closed. The refrigerant flows into the collector (19) via the open valve (26). The refrigerant is superheated on the low-pressure side of the internal heat exchanger (15) and is then sucked in by the compressor (12). As a result of the switchover valve 30 being switched into the cooling operating mode, it is possible to carry out cooling with the valve 13 in the heating position. The refrigerant dissipates some of the heat to the engine coolant via a refrigerant/engine coolant heat exchanger 27 and then flows through the switchover valve 30 through the non-return valve 10 into the gas cooler 14, where it dissipates further heat to the environment and is cooled further in the high-pressure part of the interior heat exchanger 15. After it has passed through the non-return valve 6, the refrigerant is expanded to evaporation pressure in the first expansion valve 16. The second expansion valve 17 is not connected into the circuit and is therefore closed. The refrigerant flows into the collector 19 via the open valve 26. On the low-pressure side of the internal heat exchanger 15, the refrigerant is superheated and then sucked in by the compressor 12.

In the air-conditioning unit, the air stream for the cabin is cooled, and the atmospheric moisture which it contains is condensed at the cold surfaces of the heat exchangers. If necessary, the air is heated by means of the heading heat exchanger 7.

If the valve 13 is switched to the heating operating mode, the refrigerant dissipates the heat to the engine coolant via a refrigerant/engine coolant heat exchanger (27). With the switchover valve 30 in the position for the heating operating mode, the refrigerant passes to the entrance of the high-pressure side of the internal heat exchanger 15 and then into the first expansion valve 16. The non-return valve 6 prevents a return flow of the refrigerant into the gas cooler 14, in which heat can be dissipated to the environment and the refrigerant which it contains condenses. In the process, the specific volume increases, which leads to a flow of the refrigerant back out of the circuit. As a result, the gas cooler is filled up with liquid refrigerant. After suitable throttling and uptake or transfer of heat in the evaporator 5, the refrigerant flows through the second expansion valve 17, in which it is isenthalpically expanded to the evaporation pressure level of the heat uptake. Valve 26 is closed. In the refrigerant/heat-transfer fluid heat exchanger 18, heat is fed to the refrigerant from the engine coolant, with superheating if appropriate. The refrigerant flows through the collector 19, the low-pressure side of the interior heat exchanger 15 and passes to the compressor 12. With this circuit arrangement, the energy contained in the refrigerant after the compression is introduced into the engine coolant, which is therefore heated up quickly after driving has commenced. This offers advantages with regard to wear, consumption and emissions. Furthermore, for cooling operation, a considerable heat sink is available at the outset, which improves the initial response of the refrigeration installation. In addition, there are further advantages for operation of the refrigeration installation. The dissipation of heat takes place not only in the gas cooler but also via the engine cooler. This allows more efficient dissipation of heat. Furthermore, the entry temperature of the refrigerant into the gas cooler is considerably reduced. The temperature is therefore below 100° C., which represents a considerable advantage with regard to the strength of the aluminum materials which are customarily used in heat exchangers.

FIGS. 17 to 22 show some circuit combinations and combinations of features, which have been described earlier in connection with the other figures but are presented in the FIGS. 17 to 22 in particular arrangements.

What is claimed is:

1. An air conditioning system with a heating circuit for heating and a cooling circuit for cooling an incoming air stream for an interior compartment of a motor vehicle having an engine coolant circuit, said system including a refrigerant circuit, which includes a refrigerant compressor (12) for compressing substantially gaseous refrigerant, a switchover valve (13) arranged downstream of said refrigerant compressor (12) for directing the refrigerant compressed in said refrigerant compressor (2) selectively through one of said cooling and heating circuits, a first heat exchanger (14) arranged in said cooling circuit downstream of the refrigerant compressor (12) for dissipating heat from the refrigerant, a first expansion device (16) arranged downstream of the first heat exchanger (14), a second heat exchanger (15) arranged downstream of said first heat exchanger (14) for transferring heat from the compressed refrigerant to the expanded refrigerant before it is returned said refrigerant compressor (12), a second expansion device (17) arranged in said cooling circuit downstream of said first expansion device (16) and upstream of said second heat exchanger (15), a third heat exchanger (5) arranged in the cooling circuit between said first and second expansion devices (16, 17), such that the pressure level of the third heat exchanger (5) can be controlled by controlling the first and second expansion devices (16, 17) and a forth heat exchanger (27) arranged in said heating circuit for transferring heat to the engine coolant circuit when the switch-over valve (13) is set to direct the refrigerant compressed in the refrigerant compressor (12) to the heating circuit.

2. The air conditioning system as claimed in claim 1, wherein the installed heat transfer capacity of the first and third heat exchangers corresponds to the maximum heating capacity of the heat pump system for the incoming air for the interior compartment of the motor vehicle.

3. The air conditioning system as claimed in claim 1, wherein at least one of the first and the third heat exchangers is a refrigerant/heat-transfer liquid heat exchanger, a heat-transfer liquid being conducted through a second circuit, via which heat can be transferred from the refrigerant circuit to the air flow to the interior compartment of the vehicle.

4. The air conditioning system for a motor vehicle as claimed in claim 1, in which the incoming air for the interior compartment of the motor vehicle can be heated via the first heat exchanger of the cooling circuit, the refrigerant can be expanded in the first expansion device (16) from a higher pressure level to a suitable intermediate pressure level by means of the first expansion device (16), and in which heat can be taken up from the compressed refrigerant via the second heat exchanger (15), and heat can be transferred from or to the refrigerant via the third heat exchanger (5) at the intermediate pressure level, a the refrigerant can be expanded from the intermediate pressure level by means of a second expansion device (17).

5. The air conditioning system as claimed in claim 4, wherein the incoming air flow for the interior compartment is dried with the aid of the heat which is supplied to the air supplied to the interior vehicle compartment at the intermediate pressure level.

6. The air conditioning system as claimed in claim 1, wherein the heating circuit extending from the switch-over valve (13) extends through the engine coolant heat exchanger (27) for transferring heat to the engine coolant and is connected to the line extending from the second beat exchanger (15) to the refrigerant compressor (12) which line includes a switch-over valve (21), and duct means for selectively conducting the refrigerant through the first heat exchanger (14) before it is returned to the refrigerant compressor (12).

7. The air conditioning system as claimed in claim 6, wherein the duct means for selectively conducting the refrigerant through the first heat exchanger (14) before it is returned to the refrigerant compressor includes the second expansion valve ahead of the first heat exchanger (14).

8. The air conditioning system as claimed in claim 6, wherein the heating circuit extending from the switch-over valve (13) through the engine coolant heat exchanger (27) is connected to the upstream end of the first heat exchanger (14) so that the refrigerant is returned to the refrigerant compressor via the first heat exchanger (14), the second heat exchanger (15) and the third heat exchanger (5).

9. The air conditioning system as claimed in claim 8, wherein a bypass line is disposed at the upstream end of the second beat exchanger (15) and provided with a second switch over valve (21) such that the refrigerant in the heating circuit can selectively bypass the first heat exchanger (14).

10. The air conditioning system as claimed in claim 1, wherein a refrigerant-coolant heat exchanger (18) is arranged downstream of the second expansion device (17) and a bypass line with a valve (26) is provided so as to bypass the second expansion device (17) and the refrigerant-coolant heat exchanger (18).

* * * * *